US008243150B2

(12) United States Patent
Hitomi et al.

(10) Patent No.: US 8,243,150 B2
(45) Date of Patent: Aug. 14, 2012

(54) NOISE REDUCTION IN AN IMAGE PROCESSING METHOD AND IMAGE PROCESSING APPARATUS

(75) Inventors: Yasunobu Hitomi, Kanagawa (JP); Junhua Chen, Kanagawa (JP)

(73) Assignee: Sony Corporation, Tokyo (JP)

( * ) Notice: Subject to any disclaimer, the term of this patent is extended or adjusted under 35 U.S.C. 154(b) by 1120 days.

(21) Appl. No.: 12/124,507

(22) Filed: May 21, 2008

(65) Prior Publication Data

US 2008/0291300 A1    Nov. 27, 2008

(30) Foreign Application Priority Data

May 23, 2007    (JP) ................ P2007-136184

(51) Int. Cl.
 *H04N 5/228*    (2006.01)
 *H04N 5/14*    (2006.01)
 *H04N 5/217*    (2011.01)
(52) U.S. Cl. .............. 348/208.6; 348/699; 348/241
(58) Field of Classification Search .............. None
 See application file for complete search history.

(56) References Cited

U.S. PATENT DOCUMENTS

| 5,208,673 | A | * | 5/1993 | Boyce | 348/701 |
| 5,361,105 | A | * | 11/1994 | Iu | 348/699 |
| 5,442,407 | A | | 8/1995 | Iu | |
| 7,295,245 | B2 | * | 11/2007 | Ha | 348/452 |
| 7,729,555 | B2 | * | 6/2010 | Chen et al. | 382/261 |
| 7,885,327 | B2 | * | 2/2011 | Han | 375/240.12 |
| 2005/0169371 | A1 | * | 8/2005 | Lee et al. | 375/240.03 |
| 2006/0012719 | A1 | * | 1/2006 | Karczewicz et al. | 348/699 |
| 2006/0245495 | A1 | * | 11/2006 | Han et al. | 375/240.13 |
| 2007/0160143 | A1 | * | 7/2007 | Lee | 375/240.15 |

FOREIGN PATENT DOCUMENTS

| EP | 0 540 102 | 5/1993 |
| GB | 2 264 414 | 8/1993 |
| JP | 9 261526 | 10/1997 |
| JP | 11 75105 | 3/1999 |
| JP | 2001 126061 | 5/2001 |
| WO | WO 2006 114951 | 11/2006 |

OTHER PUBLICATIONS

Boyce J M Ed—Institute of Electrical and Electronics Engineers: "Noise reduction of image sequences using adaptive motion compensated frame averaging", Speech Processing 1. San Francisco, Mar. 23-26, 1992; [Proceedings of the International Conference on Acoustics, Speech and Signal Processing (ICASSP)], New York, IEEE, US, vol. 3, Mar. 23, 1992, pp. 461-464, XP010058911, DOI: DOI::10.1109/ICASSP.1992.226176 ISBN: 978-0-7803-0532-8.

(Continued)

*Primary Examiner* — Justin P Misleh
(74) *Attorney, Agent, or Firm* — Frommer Lawrence & Haug LLP; William S. Frommer; Paul A. Levy

(57) ABSTRACT

An image processing method is disclosed. The image processing method uses a first still image and a second still image which are chronologically successive and outputs an image from which noise has been reduced. A motion of the second still image is compensated block by block. Reliability of addition of the first still image and the motion-compensated second still image is determined pixel by pixel and a weighting factor is set corresponding thereto. The first still image and the motion-compensated second still image are added or averaged with the weighting factor and a processed image is obtained.

6 Claims, 23 Drawing Sheets

OTHER PUBLICATIONS

Swindell W et al: "Noise Reduction by Frame Averaging: A Numerical Simulation for Portal Imaging Systems", Medical Physics, AIP, Melville, NY, US, vol. 22, No. 9, Sep. 1, 1995, pp. 1405-1411, XP000533338, ISSN: 0094-2405, DOI:DOI:10.1118/1.597618.

* cited by examiner

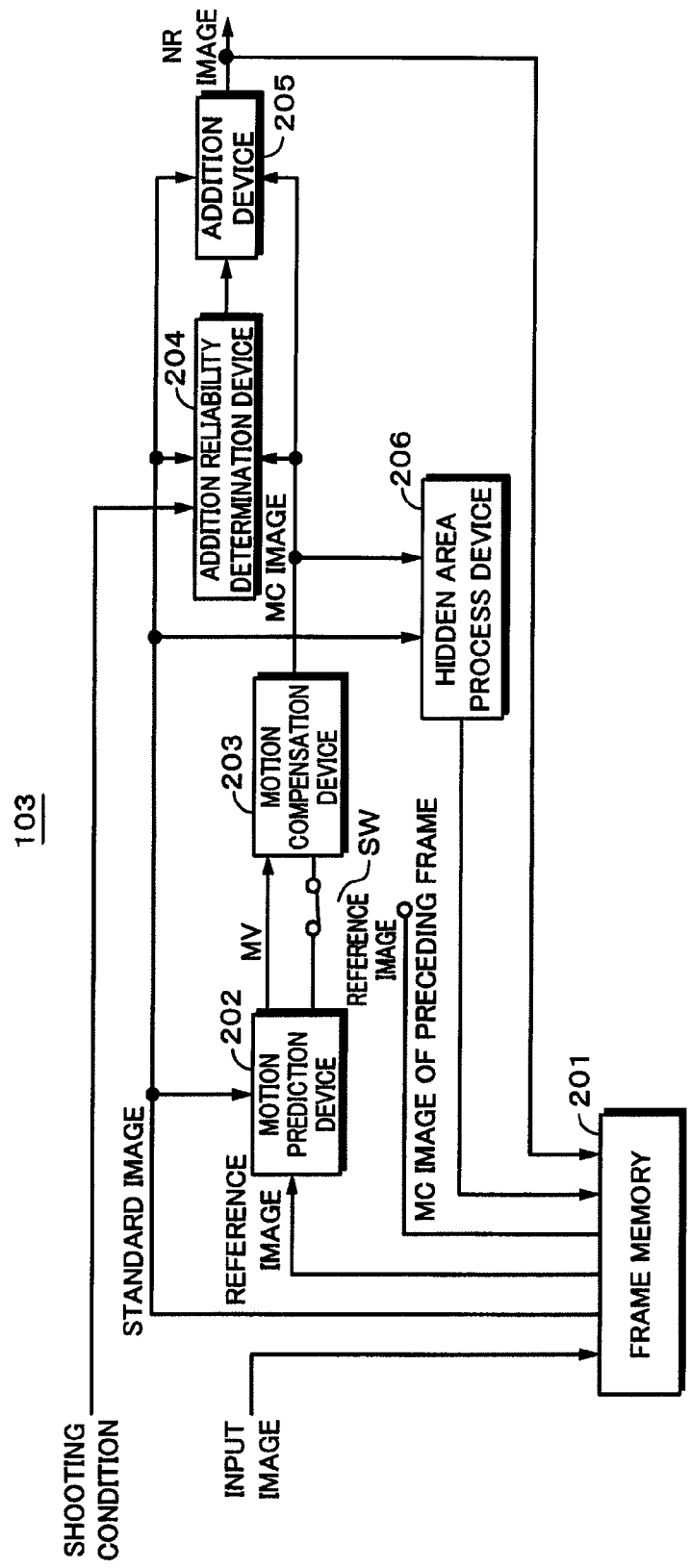

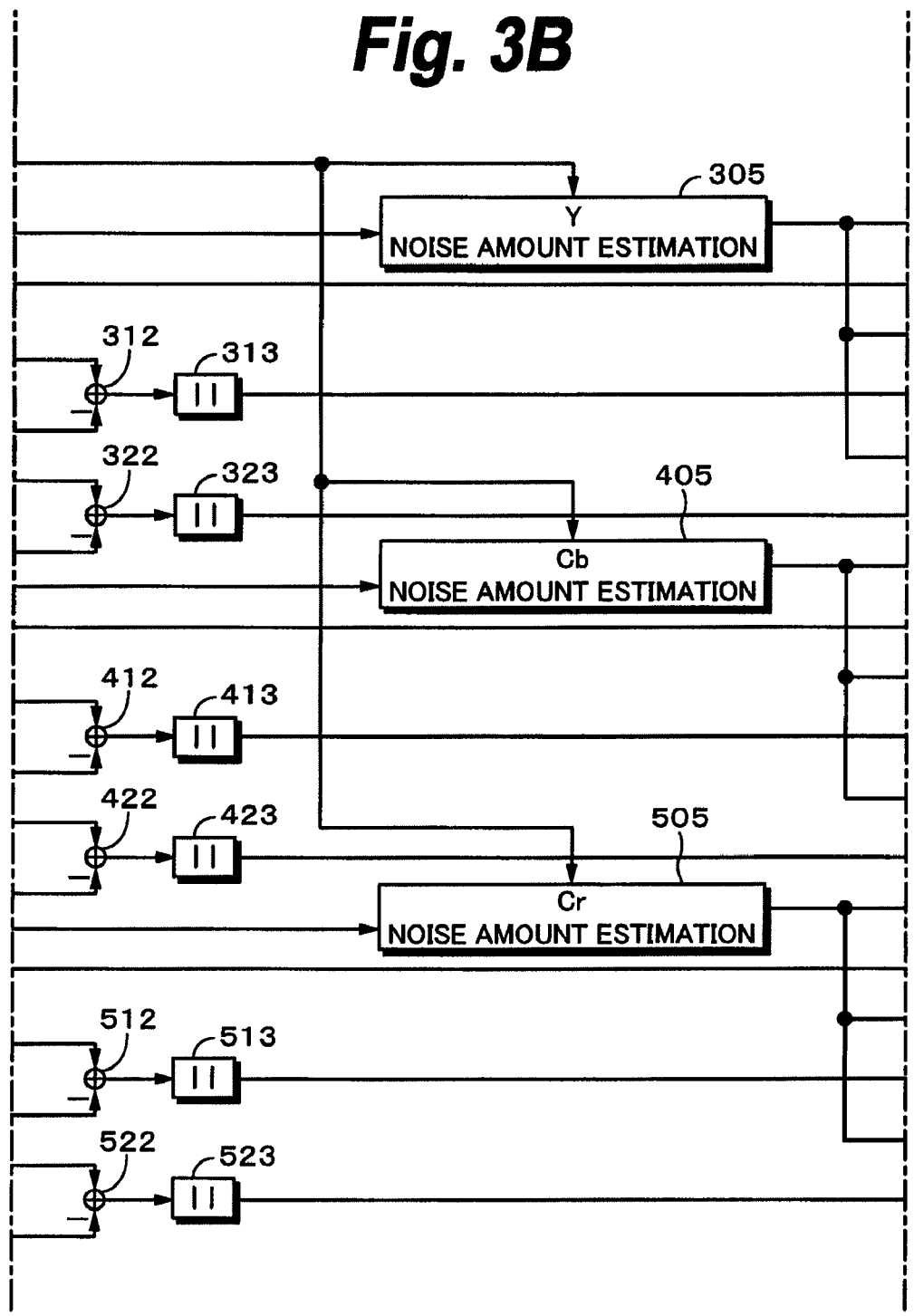

Fig. 6
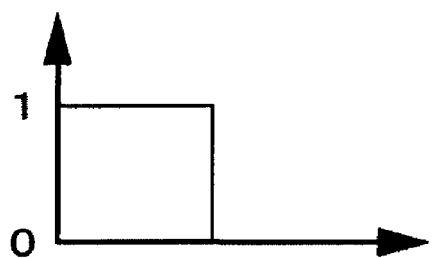 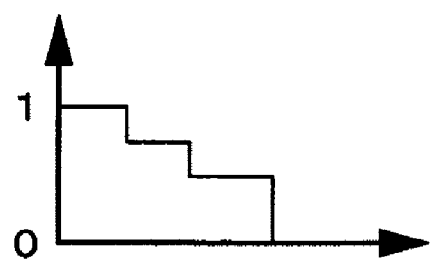
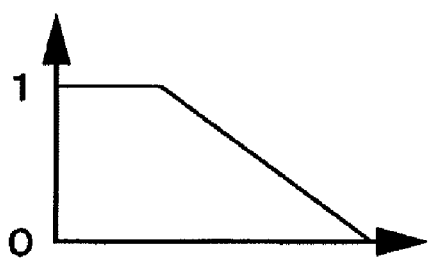 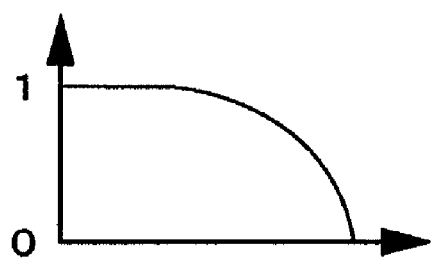
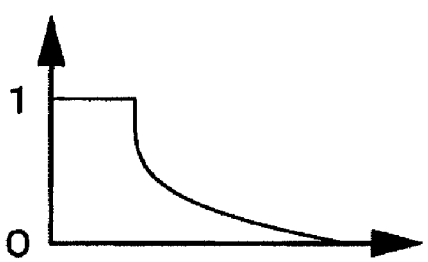

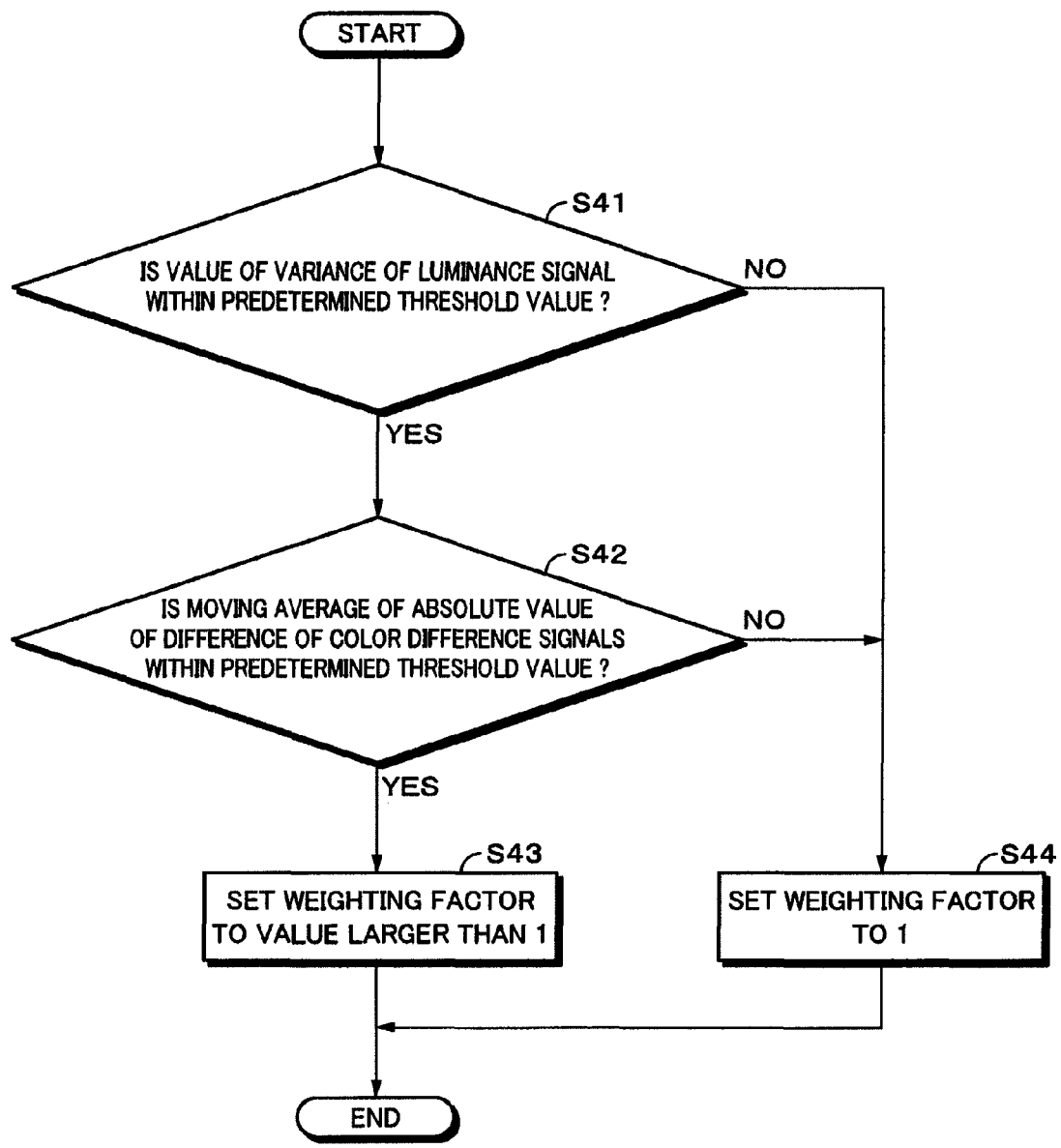

NOISE REDUCTION IN AN IMAGE PROCESSING METHOD AND IMAGE PROCESSING APPARATUS

CROSS REFERENCES TO RELATED APPLICATIONS

The present invention contains subject matter related to Japanese Patent Application JP 2007-136184 filed in the Japanese Patent Office on May 23, 2007, the entire contents of which being incorporated herein by reference.

BACKGROUND OF THE INVENTION

1. Field of the Invention

The present invention relates an image processing method and an image processing apparatus that is applicable to an image capturing apparatus and that reduce noise.

2. Description of the Related Art

In recent years, there have been strong demands for shooting techniques for still cameras and video cameras under lower light intensity and for shorter exposure time than before. However, when an image is shot with a low light intensity and for a short exposure time, since the amount of incident light is small, the charge storage amount is low. To obtain a bright image, it is necessary to amplify the captured signal. At this point, noise that occurs in an image sensor and an analog circuit is also amplified. As a result, a noisy low quality image is obtained. To solve this problem, an image is shot for a long exposure time such that the charge storage amount increases. Random components are relatively decreased such that S/N ratio is improved. However, when an image is shot for a long exposure time, the image blurs due to hand vibration during exposure (referred to as exposure blurring). Thus it was necessary to fix an image capturing apparatus with a tripod or the like.

As an alternative method, images may be serially shot at a blurring-free shutter speed, for example, of 1/30 seconds and then a plurality of images that have been serially shot are averaged to decrease noise that does not correlate with the time direction. However, there may be problems of deterioration such as image blurring due to moving of a camera and a moving object and multi-exposure afterimages due to a moving object.

In addition, Japanese Patent Application Laid-Open No. HEI 9-261526 (referred to as patent document 1) discloses a technique of correcting a plurality of hand-vibrated images serially shot and overlaying them. In this case, hand vibration occurs in an exposure time, for example in one field or one frame. Likewise, Japanese Patent Application Laid-Open No. HEI 11-75105 (referred to as patent document 2) discloses a technique of dividing the whole exposure time into a plurality of portions, correcting hand-vibrated images obtained in each portion of the whole exposure time, and adding the corrected images to obtain a high quality image.

SUMMARY OF THE INVENTION

As described in the foregoing patent document 1 and patent document 2, in the technique of adding a plurality of images whose motions have been corrected, the accuracy of moving vectors detected from an image containing an unnecessarily moving object or the like and an image having a low contrast is low. Thus, as a drawback of this technique, image quality is not sufficiently improved. In the technique of adding frames with weighting factored coefficients, the accuracy of the resultant image was insufficient. In addition, when the exposure time becomes long, noise increases. Thus, noise amount may vary depending on the shutter speed with the same exposure amount. Unless taking into account of such shooting conditions, noise is unable to be removed with high accuracy.

In view of the foregoing, it would be desirable to provide an image processing method and an image processing apparatus that can remove noise with high accuracy.

According to an embodiment of the present invention, there is provided an image processing method of using a first still image and a second still image which are chronologically successive and outputting an image from which noise has been reduced. A motion of the second still image is compensated block by block. Reliability of addition of the first still image and the motion-compensated second still image is determined pixel by pixel and a weighting factor is set corresponding thereto. The first still image and the motion-compensated second still image are added or averaged with the weighting factor and a processed image is obtained.

According to an embodiment of the present invention, there is provided an image processing method of using a first still image, a second still image, and a third still image which are chronologically successive and outputting an image from which noise has been reduced. A motion of the second still image is compensated block by block. Reliability of addition of the first still image and the motion-compensated second still image is determined pixel by pixel and a first weighting factor is set corresponding thereto. The first still image and the motion-compensated second still image are added or averaged with the first weighting factor and a processed image is obtained. A motion of the third still image is compensated block by block. Reliability of addition of the processed image and the motion-compensated third still image is determined pixel by pixel and a second weighting factor is set corresponding thereto. The processed image and the motion-compensated third still image are added or averaged with the second weighting factor and a processed image is obtained.

According to an embodiment of the present invention, there is provided an image processing method of reducing noise from moving images which are input at intervals of a predetermined time unit. A motion of an image that has been processed one predetermined time unit before is compensated block by block. Reliability of addition of a current moving image and the motion-compensated image processed the one predetermined time unit before is determined pixel by pixel and a weighting factor is set corresponding thereto. The current moving image and the motion-compensated image processed the one predetermined time unit before are added or averaged with the weighting factor and a processed image is obtained corresponding to the current moving image.

According to an embodiment of the present invention, there is provided an image processing method of reducing noise from moving images which are input at intervals of a predetermined time unit. A moving vector of a current moving image and an image which has been processed one predetermined time unit before is obtained block by block. A motion of the image which has been processed the one predetermined time unit before and an image which has been processed two predetermined time units before is compensated with the moving vector. Reliability of addition of the current moving image and the motion-compensated image which has been processed the one predetermined time unit before is determined pixel by pixel and a first weighting factor is set corresponding thereto. The current moving image and the motion-compensated image which has been processed the one time unit before are added or averaged and a first processed image is obtained. Reliability of addition of the motion-compensated image which has been processed the two predetermined time units before and the first processed image is determined pixel by pixel and a second weighting factor is set corresponding thereto. The motion-compensated image which has been processed the two predetermined time units before and the first processed image are added or averaged with the second weighting factor and a second processed image is obtained corresponding to the current moving image.

According to an embodiment of the present invention, there is provided an image processing apparatus which uses a first still image and a second still image which are chronologically successive and which outputs an image from which noise has been reduced. The image processing apparatus includes a motion compensation device, a determination device, and an addition device. The motion compensation device compensates a motion of the second still image block by block. The determination device determines reliability of addition of the first still image and the motion-compensated second still image pixel by pixel and sets a weighting factor corresponding thereto. The addition device adds or averages the first still image and the motion-compensated second still image with the weighting factor and obtains a processed image.

According to an embodiment of the present invention, there is provided an image processing apparatus which uses a first still image, a second still image, and a third still image which are chronologically successive and which outputs an image from which noise has been reduced. The image processing apparatus includes a motion compensation device, a determination device, and an addition device. The motion compensation device compensates a motion of the second still image block by block. The determination device determines reliability of addition of the first still image and the motion-compensated second still image pixel by pixel and sets a first weighting factor corresponding thereto. The addition device adds or averages the first still image and the motion-compensated second still image with the first weighting factor and obtains a processed image. The motion compensation device compensates a motion of the third still image block by block. The determination device determines reliability of addition of the processed image and the motion-compensated third still image pixel by pixel and sets a second weighting factor corresponding thereto. The addition device adds or averages the processed image and the motion-compensated third still image with the second weighting factor and obtains a processed image.

According to an embodiment of the present invention, there is provided an image processing apparatus which reduces noise from moving images which are input at intervals of a predetermined time unit. The image processing apparatus includes a motion compensation device, a determination device, and an addition device. The motion compensation device compensates a motion of an image that has been processed one predetermined time unit before block by block. The determination device determines reliability of addition of a current moving image and the motion-compensated image processed the one predetermined time unit before pixel by pixel and sets a weighting factor corresponding thereto. The addition device adds or averages the current moving image and the motion-compensated image processed the one predetermined time unit before with the weighting factor for addition and obtains a processed image corresponding to the current moving image.

According to an embodiment of the present invention, there is provided an image processing apparatus which reduces noise from moving images which are input at intervals of a predetermined time unit. The image processing apparatus includes a motion compensation device, a determination device, and an addition device. The motion compensation device obtains a moving vector of a current moving image and an image which has been processed one predetermined time unit before block by block and compensates a motion of the image which has been processed the one predetermined time unit before and an image which has been processed two predetermined time units before with the moving vector. The determination device determines reliability of addition of the current moving image and the motion-compensated image which has been processed the one predetermined time unit before pixel by pixel and sets a first weighting factor corresponding thereto. The addition device adds or averages the current moving image and the motion-compensated image which has been processed the one time unit before and obtains a first processed image. The determination device determines reliability of addition of the motion-compensated image which has been processed the two predetermined time units before and the first processed image pixel by pixel and sets a second weighting factor corresponding thereto. The addition device adds or averages the motion-compensated image which has been processed the two predetermined time units before and the first processed image with the second weighting factor and obtains a second processed image corresponding to the current moving image.

According to embodiments of the present invention, when an image is shot with low light intensity, even if the camera is moved or an image of a moving object is shot, noise reduction effect can be obtained. According to embodiments of the present invention, the reliability of addition is determined pixel by pixel. As a result, noise can be reduced with high accuracy. In addition, block distortion can be suppressed. In addition, large color noise that occurs in a flat portion can be reduced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a block diagram showing an example of a noise reduction device according to the embodiment of the present invention;

FIG. 6 is a schematic diagram showing several examples of reliability determination curves that can be used;

FIG. 21 is a schematic diagram describing a color noise reduction process according to the other embodiment of the present invention.

DETAILED DESCRIPTION OF THE PREFERRED EMBODIMENTS

Figure 1:
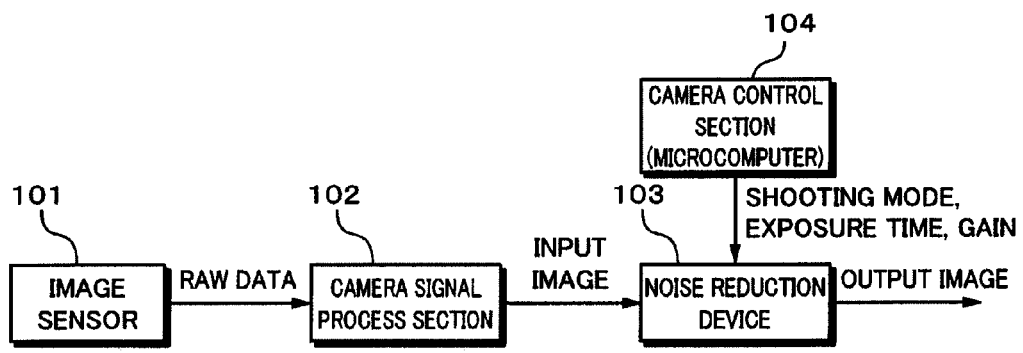
FIG. 1 is a block diagram showing an overall structure of an embodiment of the present invention.

Next, with reference to the accompanying drawings, an example of an image capturing apparatus having an image processing apparatus according to an embodiment of the present invention will be described. FIG. 1 shows an overall structure of the image capturing apparatus according to the embodiment of the present invention. Light from an object enters an image sensor 101 through an image capturing optical system (not shown).

The image capturing optical system has a zoom lens that enlarges/reduces an image of an object, a focus lens that adjusts the focal distance, an iris (diaphragm) that adjusts the light amount, an ND (Neutral Density) filter, and a driving circuit that drives these lenses and the iris. The zoom lens, the focus lens, the iris, and the ND filter are driven by a driver (not shown).

The image sensor 101 is a CCD (Charge Coupled Device), a CMOS (Complementary Metal Oxide Semiconductor), or the like. The image sensor 101 captures an image signal corresponding to the light of the object. Although an example of the image capturing apparatus is a camcorder that can shoot moving images and still images (the camcorder means a camera plus a recorder), the image capturing apparatus may be a still image digital camera, a PDA (Personal Data Assistants), a mobile phone, or the like.

The image sensor 101 may be of a primary color system or a complementary color system. Each color signal of the RGB primary color system image signals or complementary color system image signals into which an image of an object has been converted is sample-held. The gains of the color signals are controlled by an AGC (Automatic Gain Control), converted into digital image signals (referred to as row data), and then output. Row data are supplied from the image sensor 101 to a camera signal process section 102 structured as an IC (Integrated Circuit). The camera signal process section 102 performs a development process, luminance and color difference signal conversion process, and so forth.

The image signals that are output from the camera signal process section 102 are supplied to a noise reduction device 103. The noise reduction device 103 performs a noise reduction process for the image signals and outputs image signals from which noise has been reduced. A camera control section 104 (composed of a microcomputer) supplies shooting condition information for estimation of noise amount to the noise reduction device 103. The shooting condition information includes information about shooting mode, exposure time, gain, and so forth.

FIG. 2 shows an example of the noise reduction device 103. The noise reduction device 103 has a frame memory 201, a motion prediction device 202, a motion compensation device 203, an addition reliability determination device 204, an addition device 205, and a hidden area process device 206.

Next, each structural element of the noise reduction device 103 will be described. A standard image and a reference image are input to the motion prediction device 202. The motion prediction device 202 aligns a reference image that is input block by block designated corresponding to the image size with a standard image and outputs a moving vector MV for each block. The moving vector MV represents the moving amount and moving direction of a reference image against a standard image. The moving vector MV can be detected, for example, by the block matching method. For example, as an example of blocks, macro blocks can be used.

The motion compensation device 203 compensates the motion of an input image corresponding to the moving vector MV and outputs a motion-compensated image (referred to as an MC image). At this point, an input image may be selected by a switch SW and the motion of the selected image may be compensated corresponding to a moving vector obtained from a set of images. The switch SW selects one of the reference image and an MC image of the preceding frame and inputs the selected image to the motion compensation device 203.

The MC image is supplied to the addition reliability determination device 204 and the addition device 205. The standard image is supplied to the addition reliability determination device 204 and the addition device 205. The shooting condition information that is output from the camera control section is supplied to the addition reliability determination device 204. The addition device 205 adds the MC image and the standard image with a weighting factor generated by the addition reliability determination device 204.

This embodiment of the present invention can be applied to noise reduction for both still images and moving images. When a still image is shot, a plurality of still images are serially shot at a maximum speed of the image capturing apparatus. When the image sensor 101 is a CCD, images are serially shot at a speed of around 2 images per second. When the image sensor 101 is a CMOS, images are serially shot at a speed of for example 30 to 60 images per second. In this case, the first shot image is a standard image and the second shot image is a reference image. The motion of the reference image is compensated corresponding to the moving vector MC and thereby an MC image is generated. The standard image and the MC image are added by the addition device 205 with the weighting factor supplied from the addition reliability determination device 204. As a result, an image from which noise has been reduced (referred to as an NR image) is generated.

The first NR image that is output from the addition device 205 is stored in the frame memory 201. The first NR image is treated as a standard image. The second shot image is treated as a reference image. With these two images, noise reduction operation similar to the foregoing operation is performed. By repeating the noise reduction operation, random noise components are decreased.

The standard image and the MC image are supplied to the hidden area process device 206. When an MC image that is chronologically apart from a standard image by one or more images is treated as a reference image, the hidden area process device 206 suppresses propagation of deterioration of image quality of MC portions of a hidden area having low reliability. An image processed by the frame memory 201 is stored in the frame memory 201.

A weighting factor used in the addition device 205 is generated in the addition reliability determination device 204 pixel by pixel. The weighting factor represents the reliability of addition. In other words, the correctness of the motion compensation between a standard image and an MC image is determined. When a standard image and an MC image are added, if the quality of the added image does not deteriorate, but noise decreases, these pixels have high reliability. Specifically, when pixels of the same portion of the images shot at different times are added, since noise that does not correlate with time can be reduced, these pixels have high reliability. In other words, reliability denote whether or not noise is superimposed on the same images or whether noise is superimposed on different images. It is necessary to generate a weighting factor corresponding to as only noise amount as possible to perform noise reduction process with high accuracy. It is assumed that when the reliability of addition is low, the value of its weighting factor is 0 and when the reliability of addition is high, the value of its weighting factor is 1. As will be described later, the addition device 205 calculates the average of the standard image and the MC image. A weighting factor of the average is the product of a weighting factor and a feedback ratio. When the feedback ratio is, for example, 1/3 and the weighting factor varies from 0 to 1, the weighting factor of the average of the MC value varies from 0 to 1/3.

Figure 3A:
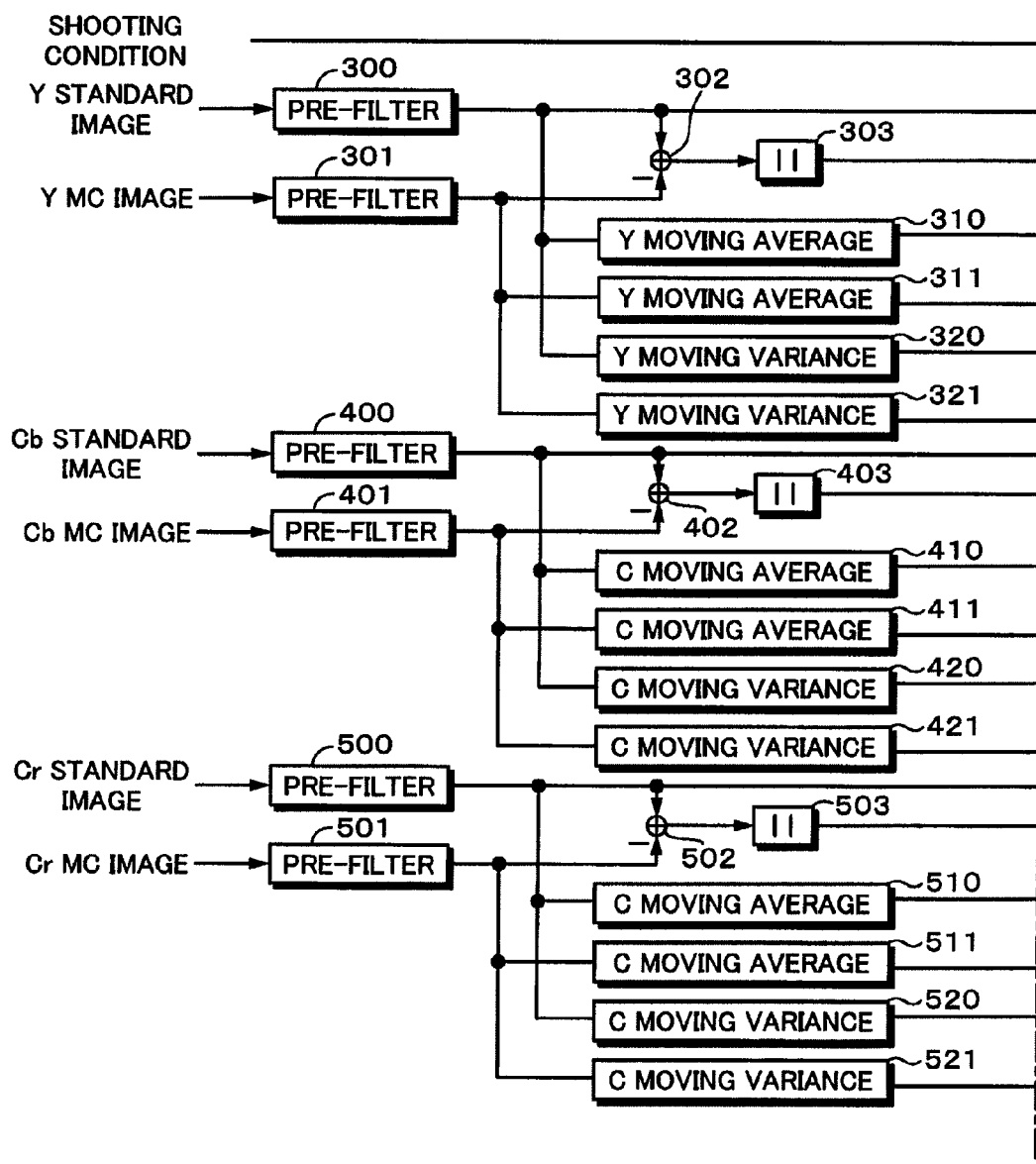
FIG. 3 is a block diagram showing an example of an addition reliability determination device according to the embodiment of the present invention.
Figure 3C:
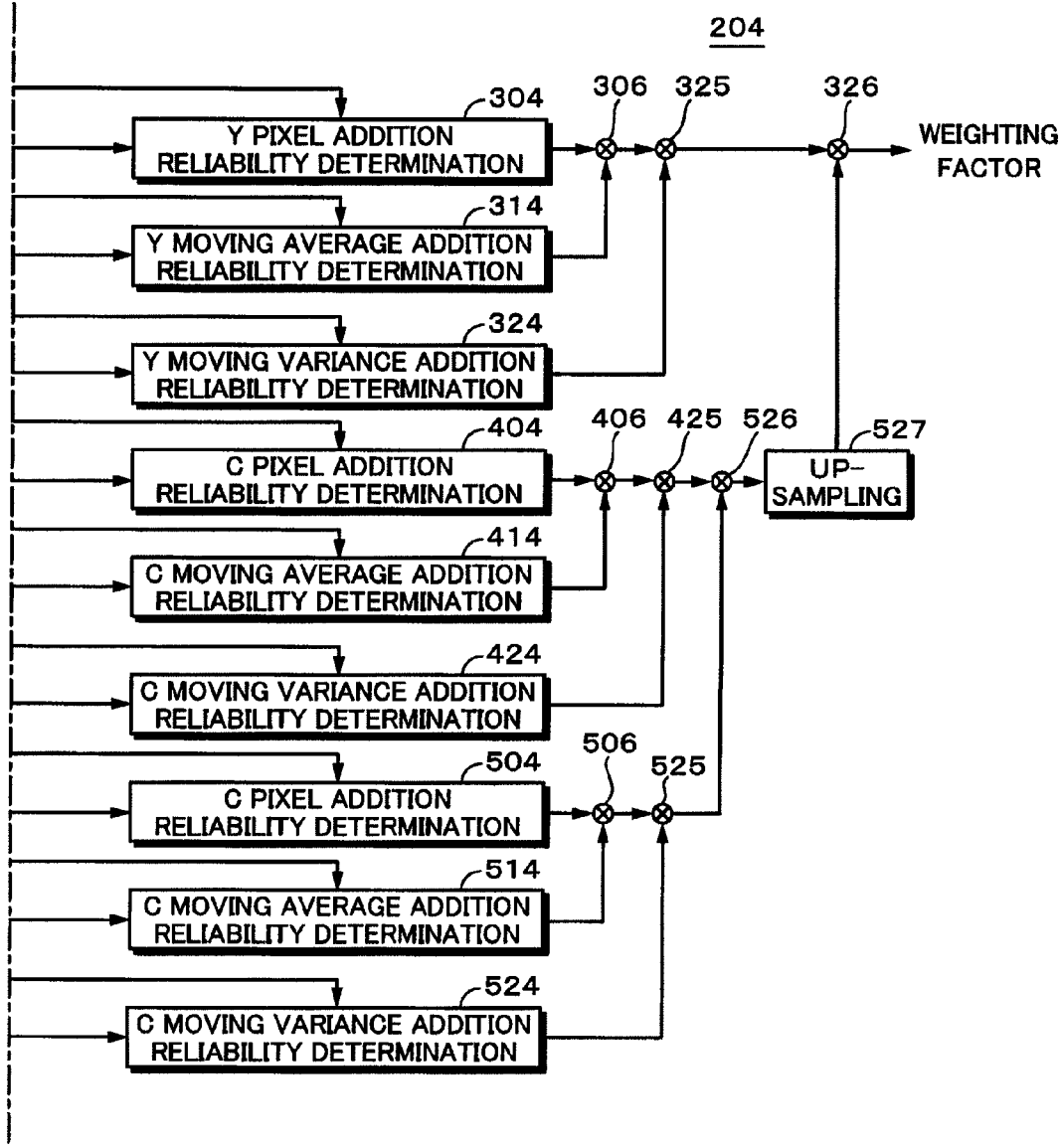

FIG. 3 shows an example of the addition reliability determination device 204. The addition reliability determination device 204 has identical determination sections for luminance signal Y and color difference signals Cb and Cr. First, the structure of the determination section for luminance signal Y will be described.

Pixel data at the spatially same position of a standard image and an MC image are supplied to a subtraction device 302 through pre-filters 300 and 301, respectively. The subtraction device 302 calculates the difference of the pixel values. An absolute value calculation device 303 converts the difference into its absolute value. The pre-filters 300 and 301 cut high frequency components of the images and thereby improve the effect of the determination of reliability of addition. In other words, the absolute value calculation device 303 outputs the absolute value of an input signal. The absolute value of the difference is supplied to a pixel addition reliability determination device 304.

An output signal of a noise amount estimation device 305 is supplied to the pixel addition reliability determination device 304. The noise amount estimation device 305 estimates noise amount corresponding to a pixel value, inputs shooting condition information such as information about shooting mode, exposure time, gain, and so forth that may affect noise amount of an image from the outside, and stores a table of data of the relationship of luminance values and noise amounts measured in various conditions. The noise amount estimation device 305 obtains the relationship of luminance value and noise amount from the table and outputs noise amount corresponding to the input luminance value.

Random noise tends to increase, for example, in proportion to exposure time. Random noise tends to increase, for example, in proportion to amplifying gain of a captured image signal. Thus, a table of pixel values and noise amounts corresponding to shutter speeds and/or gains as shooting conditions is prepared. In addition, shooting modes of the image capturing apparatus may be used as shooting conditions. Shooting conditions are set, for example, frame by frame.

Figure 4:
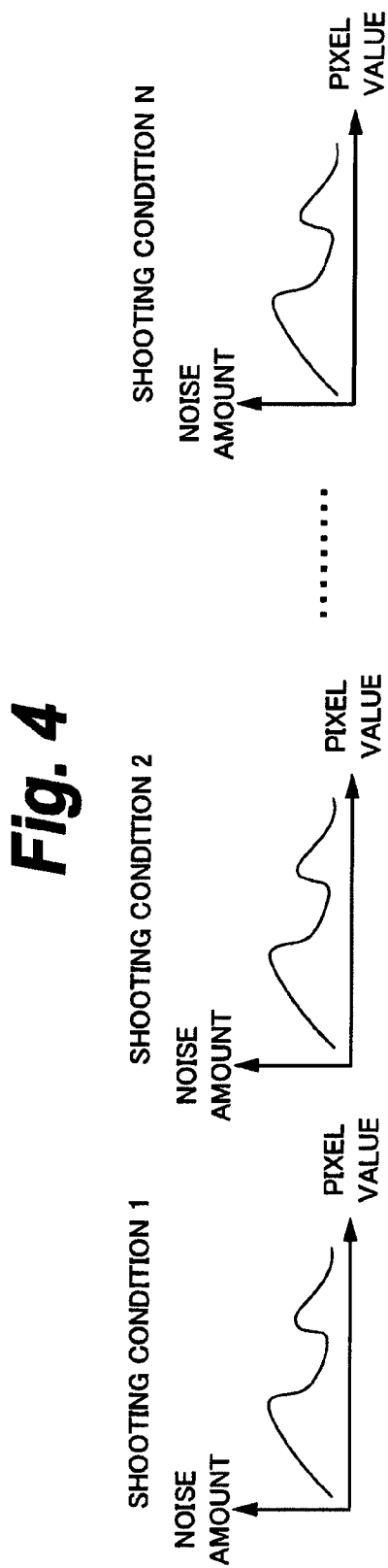
FIG. 4 is a schematic diagram showing a concept of a pixel value vs. noise amount table stored in a noise amount estimation device disposed in the addition reliability determination device.

FIG. 4 shows a concept of a pixel value vs. noise amount table stored in the noise amount estimation device 305. FIG. 4 defines the relationship of pixel values and noise amounts corresponding to shooting condition 1 to shooting condition N. The noise amount estimation device 305 inputs shooting condition information that is information about shooting mode, shutter speed (exposure time), gain, and so forth that affect noise amount of an image from the camera control section 104, obtains the relationship of luminance value and noise amount of the condition that have been measured in individual shooting conditions, and outputs noise amount corresponding to the input luminance value in the shooting condition.

The noise amount that is output from the noise amount estimation device 305 and the absolute value of the difference of pixel values (luminance) that is output from the absolute value calculation device 303 are supplied to the pixel addition reliability determination device 304. The absolute value of the difference is an input index value to the pixel addition reliability determination device 304. The pixel addition reliability determination device 304 outputs a weighting factor as the reliability of addition against the index value.

Figure 5:
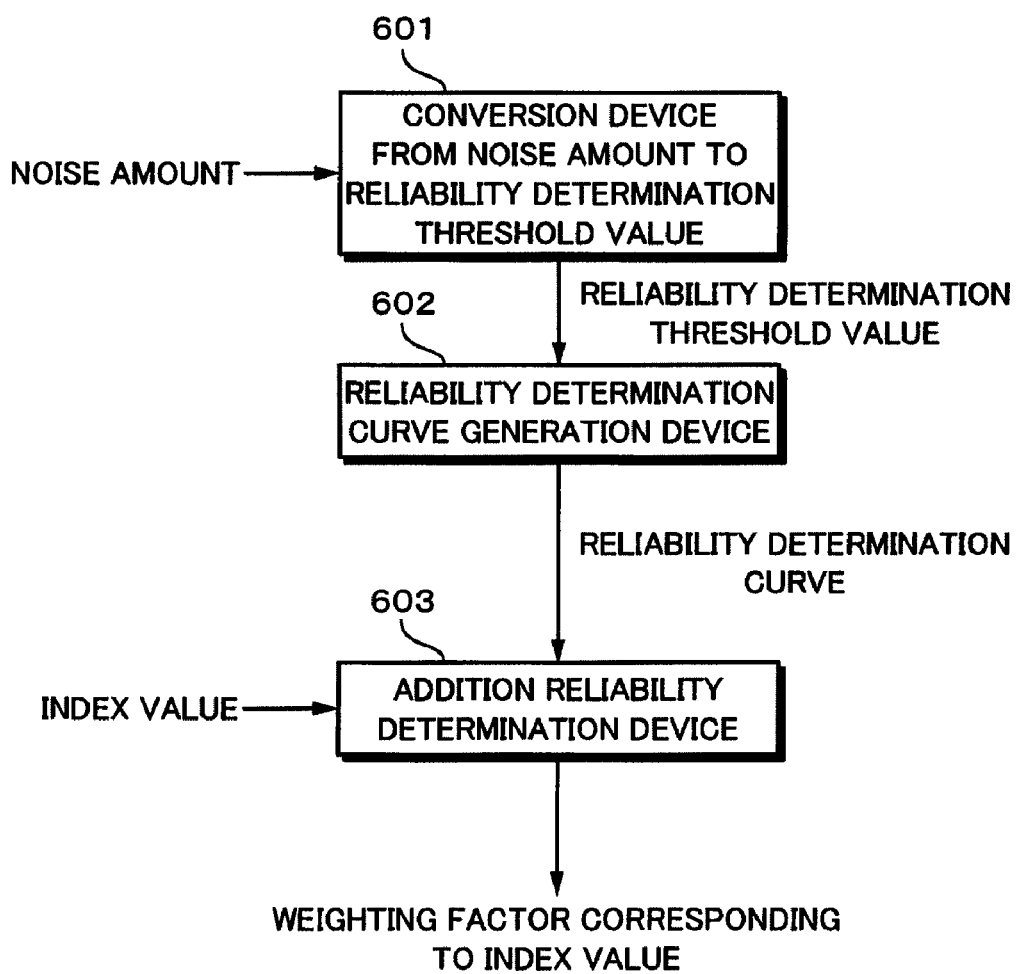
FIG. 5 is a block diagram showing an example of a pixel addition reliability determination device disposed in the addition reliability determination device.

FIG. 5 shows an example of a pixel addition reliability determination device. The luminance pixel addition reliability determination device 304 is composed of a conversion device 601 that converts noise amount that is output from the noise amount estimation device 305 into a determination threshold value, a reliability determination curve generation device 602, and an addition reliability determination device 603. The conversion device 601 converts the noise amount into a reliability determination threshold value using a table decided on the basis of visual characteristics and outputs the reliability determination threshold value. The shape of the reliability determination curve is decided on the basis of the reliability determination threshold value. The reliability determination curve represents the relationship between an input index value as an error amount and a weighting factor as the reliability against the error.

FIG. 6 shows several examples of reliability determination curves that can be used. In these graphs, the horizontal axis represents an input index value and the vertical axis represents a weighting factor corresponding to an index value. In each curve, an index value with which the weighting factor is 0 and an index value with which the weighting factor changes from 1 are reliability determination threshold values. The reliability determination threshold value is proportional to noise amount. Thus the index value of the reliability determination threshold value is proportional to noise amount.

The reliability determination curve generation device 602 decides a reliability determination curve with the reliability determination threshold value that output from the conversion device 601 and outputs the reliability determination curve. The reliability determination curve is stored as, for example, a table in a memory. The addition reliability determination device 603 inputs an index value on the basis of the reliability determination curve and outputs a weighting factor corresponding to the index value. The weighting factor is supplied from the pixel addition reliability determination device 304 to a multiplication device 306. Since the addition reliability determination device 304 uses a reliability determination curve generated with noise amount corresponding to each pixel value, it performs conversion, calculation, and determination processes pixel by pixel.

Figure 7:
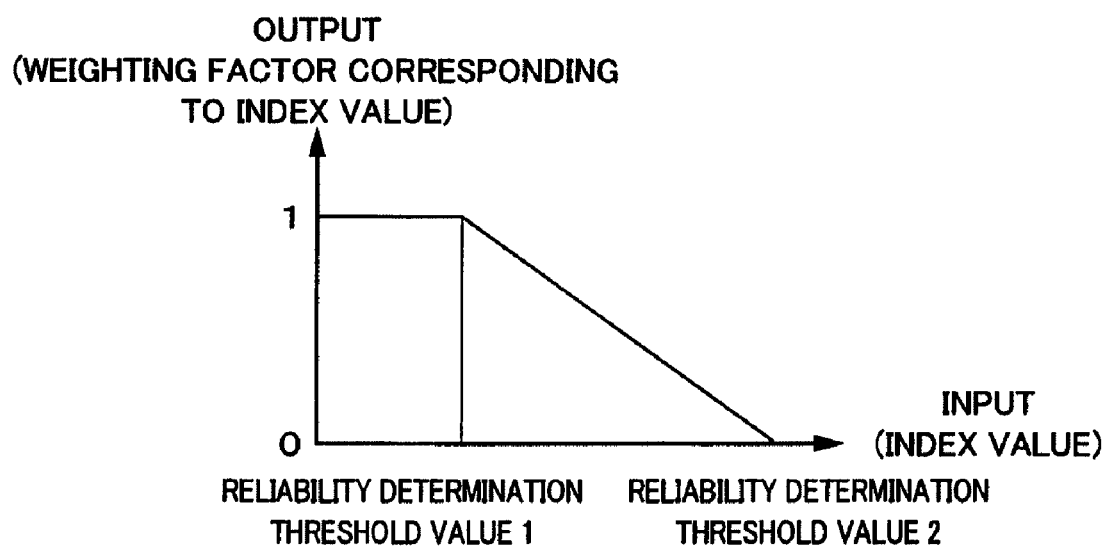
FIG. 7 is a schematic diagram showing an example of a reliability determination curve.

In an example of a reliability determination curve shown in FIG. 7, when the input index value is smaller than reliability determination threshold value 1, the weighting factor against the index value is 1. When the input index value is in the range from reliability determination threshold value 1 and reliability determination threshold value 2, the weighting factor against the index value gradually decreases to 0. Reliability determination threshold value 1 and reliability determination threshold value 2 define the shape of a reliability determination curve. Noise amount is proportional to an index value corresponding to reliability determination threshold value 1 and reliability determination threshold value 2. An input index value is converted into a weighting factor corresponding to the reliability determination curve shown in FIG. 7 and the converted weighting factor is output.

The weighting factor that is output from the addition reliability determination device 304 is supplied to the multiplication device 306. The multiplication device 306 multiplies the weighting factor that is output from the addition reliability determination device 304 by a weighting factor obtained in the same manner as the absolute value of the difference of pixels with respect to the moving average of the luminance signal. The resultant weighting factor that is output from the multiplication device 306 is supplied to a multiplication device 325. The multiplication device 325 multiplies the resultant weighting factor that is output from the multiplication device 306 by a weighting factor obtained in the same manner as the absolute value of the difference of pixels with respect to the moving variance of the luminance signal. In addition, the resultant weighting factor that is output from the multiplication device 325 is supplied to a multiplication device 326. The multiplication device 326 multiplies the resultant weighting factor that is output from the multiplication device 325 by a weighting factor obtained with respect to pixels, moving average, and moving variance of color signals. The multiplication device 326 outputs the weighting factor generated by the addition reliability determination device 204. The resultant weighting factor is supplied to the addition device 205.

Next, the case of which index values are the absolute value of the difference of moving averages of the luminance signal and the absolute value of the difference of moving variances of the luminance signal will be described. As shown in FIG. 3, pixel data at the spatially same position of the standard image and the MC image are supplied to moving average calculation devices 310 and 311 through the pre-filters 300 and 301, respectively. Likewise, the pixel data at the spatially same position of the standard image and the MC image are supplied to moving variance calculation devices 320 and 321 through the pre-filters 300 and 301, respectively.

The moving average calculation devices 310 and 311 calculate the moving average of pixel values in a square area, for example, (5×5) pixel area, around a pixel to be calculated (center pixel). As the center pixel is moved, the square area is moved such that it overlaps with the calculation area of the preceding pixel and the moving average is calculated. The moving variance calculation devices 320 and 321 calculate the variance of pixel values in a square area around a pixel to be calculated (center pixel). As the center pixel is moved, the square area is moved such that it overlaps with the calculation area of the preceding pixel and the moving variance is calculated.

With respect to the moving average and moving variance, a weighting factor is obtained to more accurately reduce noise amount. When the moving averages or moving variances of areas of a plurality of pixels are different, it is more common to determine that the images are different rather than that the absolute value of the difference of pixel values is noise.

Output signals of the moving average calculation devices 310 and 311 are supplied to a subtraction device 312. Output signals of the moving variance calculation devices 320 and 321 are supplied to a subtraction device 322. The subtraction device 312 and the subtraction device 322 calculate the difference of moving averages and the difference of moving deviancies, respectively. Absolute value calculation devices 313 and 323 convert these differences into their absolute values. The absolute value calculation device 313 outputs the absolute value of the difference of the moving averages. The absolute value calculation device 323 outputs the absolute value of the difference of the moving variances. The absolute values of the differences are supplied to a moving average addition reliability determination device 314 and a moving variance addition reliability determination device 324.

The output signal of the noise amount estimation device 305 is also supplied to the moving average addition reliability determination device 314 and the moving variance addition reliability determination device 324. The moving average addition reliability determination device 314 and the moving variance addition reliability determination device 324 have the same structure as the pixel addition reliability determination device 304 (see FIG. 5). The moving average addition reliability determination device 314 and the moving variance addition reliability determination device 324 generate a reliability determination curve (table) based on a reliability determination threshold value into which noise amount is converted. When the absolute value of the difference of the moving averages and the absolute value of the difference of the moving variances are given as index values of the reliability determination curve, a weighting factor is obtained. The weighting factor that is output from the moving average addition reliability determination device 314 for the luminance signal is supplied to the multiplication device 306. The weighting factor that is output from the moving variance addition reliability determination device 324 for the luminance signal is supplied to the multiplication device 325.

The processes of obtaining a weighting factor with index values of the absolute value of the difference of pixels of the luminance signal, the absolute value of the difference of moving averages of the luminance signal, and the absolute value of the difference of moving variances of the luminance signal have been described. Likewise, with respect to color signals, weighting factors are obtained. For component color video signals, the ratios of sampling frequency of luminance signal Y, sampling frequency of color difference signal Cb, and sampling frequency of color difference signal Cr are represented by (4:2:0), (4:2:2), and (4:1:1). Like the foregoing luminance signal Y, weighting factors of color difference signals Cb and Cr are obtained.

For luminance signal Y and color difference signals Cb and Cr, a weighting factor generation process is performed for the same area of an image. As is clear from the ratios of the foregoing sampling frequencies, the weighting factor obtained for color difference signals Cr and Cb is insufficient in number against the weighting factor obtained for luminance signal Y. To solve this problem, an up-sampling circuit 527 that performs an interpolation process is disposed. The weighting factor for color difference signals that is output from the up-sampling circuit 527 is supplied to the multiplication device 326. The multiplication device 326 multiplies the weighting factor that is output from the up-sampling circuit 527 by the weighting factor for the luminance signal.

Next, a process for color difference signal Cb will be described. Color difference signal Cb of the standard image is supplied to a noise amount estimation device 405 through a pre-filter 400. The shooting condition information is supplied to the noise amount estimation device 405. The noise amount estimation device 405 outputs an estimated value of noise amount based on a table that represents the relationship of pixel values and noise amounts corresponding to individual shooting conditions like the noise amount estimation device 305 for the luminance signal. The estimated value of the noise amount is output to a pixel addition reliability determination device 404.

Color difference signal Cb of the standard image and color difference signal Cb of the MC image are supplied to a subtraction device 402 through the pre-filter 400 and a pre-filter 401, respectively. An absolute value calculation device 403 converts the subtracted result of the subtraction device 402 into its absolute value. The pixel addition reliability determination device 404 obtains a weighting factor whose index value is the absolute value of the difference of pixels. The pixel addition reliability determination device 404 has the same structure as the pixel addition reliability determination device 304 (see FIG. 5). The pixel addition reliability determination device 404 outputs a weighting factor that is the reliability of addition corresponding to the index value (absolute value of difference of pixels).

Next, the case of which index values are the absolute value of the difference of moving averages of color difference signal Cb and the absolute value of the difference of moving variances of color difference signal Cb will be described. Pixel data at the spatially same position of the standard image and the MC image are supplied to moving average calculation devices 410 and 411 through the pre-filters 400 and 401, respectively. Likewise, the pixel data at the spatially same position of the standard image and the MC image are supplied to moving variance calculation devices 420 and 421 through the pre-filters 400 and 401, respectively. The moving average calculation devices 410 and 411 calculate the moving average of pixel values in a square area around a pixel to be calculated (center pixel). As the center pixel is moved, the square area is moved such that it overlaps with the calculation area of the preceding pixel and the moving average is calculated. The moving variance calculation devices 420 and 421 calculate the variance of pixel values in a square area around a pixel to be calculated (center pixel). As the center pixel is moved, the square area is moved such that it overlaps with the calculation area of the preceding pixel and the moving variance is calculated. With respect to the moving average and moving variance, weighting factors are obtained to more accurately reduce noise amount.

Output signals of the moving average calculation devices 410 and 411 are supplied to a subtraction device 412. Output signals of the moving variance calculation devices 420 and 421 are supplied to a subtraction device 422. The subtraction device 412 and the subtraction device 422 calculate the difference of moving averages and the difference of moving deviancies, respectively. Absolute value calculation devices 413 and 423 convert these differences into their absolute values. The absolute value calculation device 413 outputs the absolute value of the difference of the moving averages. The absolute value calculation device 423 outputs the absolute value of the difference of the moving variances. The absolute values of the differences are supplied to a moving average addition reliability determination device 414 and a moving variance addition reliability determination device 424. The output signal of the noise amount estimation device 405 is also supplied to the moving average addition reliability determination device 414 and the moving variance addition reliability determination device 424. The moving average addition reliability determination device 414 and the moving variance addition reliability determination device 424 have the same structure as the pixel addition reliability determination device 304 (see FIG. 5). The moving average addition reliability determination device 414 and the moving variance addition reliability determination device 424 output weighting factors that are reliability of addition as index values of the absolute value of the difference of moving average and the absolute value of the difference of moving variances, respectively.

The weighting factor that is output from the moving average addition reliability determination device 414 for color difference signal Cb is supplied to a multiplication device 406. The multiplication device 406 multiplies the weighting factor that is output from the moving average addition reliability determination device 414 by the weighting factor that is output from the pixel addition reliability determination device 404. The weighting factor that is output from the moving average addition reliability determination device 424 for color difference signal Cb is supplied to a multiplication device 425. The multiplication device 425 multiplies the weighting factor that is output from the moving average addition reliability determination device 424 by the weighting factor that is output from the multiplication device 406.

For the other color difference signal Cr, the same structure as the foregoing color difference signal Cb is provided. In other words, pre-filters 500 and 501, a noise amount estimation device 505, a subtraction device 502, an absolute value calculation device 503, and a pixel addition reliability determination device 504 obtain a weighting factor whose index value is the absolute value of the difference of pixels of color difference signal Cr. The pre-filters 500 and 501, the noise amount estimation device 505, moving average calculation devices 510 and 511, a subtraction device 512, an absolute value calculating device 513, and a moving average addition reliability determination device 514 obtain a weighting factor whose index value is the absolute value of the difference of moving averages of color difference signal Cr. The pre-filters 500 and 501, the noise amount estimation device 505, moving deviance calculation devices 520 and 521, a subtraction device 522, an absolute value calculation device 523, and a moving average addition reliability determination device 524 obtain a weighting factor whose index value is the absolute value of the difference of moving variances of color difference signal Cr.

A multiplication device 506 multiplies the weighting factor whose index value is the absolute value of the difference of moving averages and the weighting factor whose index value is the absolute value of the difference of moving averages. A multiplication device 525 multiplies the weighting factor that is output from the multiplication device 506 by the weighting factor whose index value is the absolute value of the difference of moving variances. A multiplication device 526 multiplies the weighting factor of color difference signal Cr that is output from the multiplication device 525 by the weighting factor of the foregoing color difference signal Cb. The weighting factor that is output from the multiplication device 526 is supplied to the up-sampling circuit 527. The up-sampling circuit 527 interpolates the weighting factor of the color difference corresponding to the color difference format and matches the weighting factor of the color difference signals with that of the weighting factor of the luminance signal. The multiplication device 326 multiplies the weighting factor that is output from the multiplication device 325 by the weighting factor that is output from the up-sampling circuit 527. The multiplication device 326 outputs a weighting factor that represents the final reliability of a pixel to be considered. These weighting factors represent the reliability of luminance pixel, luminance moving average, luminance moving variance, color difference pixel, color difference moving average, and color difference moving variance as successive values in the range from 0 to 1.

Figure 8:
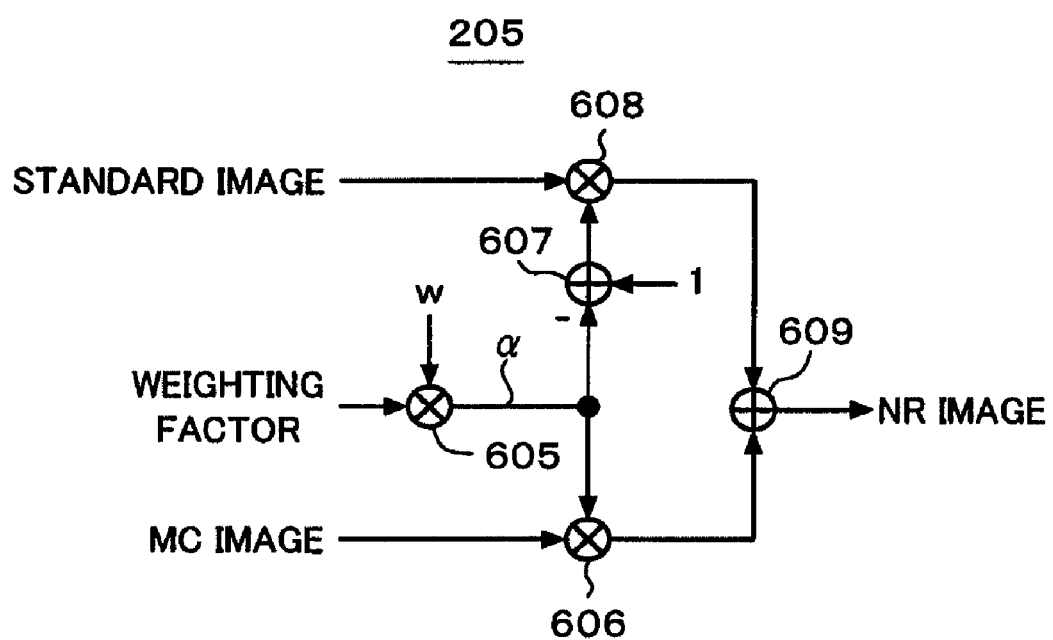
FIG. 8 is a block diagram showing an example of an addition device disposed in the addition reliability determination device.

FIG. 8 shows an example of the addition device 205. A multiplication device 605 multiplies the weighting factor that is output from the addition reliability determination device 204 by feedback coefficient W of the MC image. A coefficient (a) that is output from the multiplication device 605 is supplied to a multiplication device 606. The multiplication device 606 multiplies the MC image by coefficient α. Coefficient α is also supplied to a subtraction device 607. The subtraction device 607 generates (1−α). (1−α) is supplied to a multiplication device 608. The multiplication device 608 multiplies the standard image by (1−α). An addition device 609 adds the images that are output from the multiplication device 606 and the output of the multiplication device 608. The addition device 609 obtains an NR image from which noise has been removed. When frames are successively represented by 0th frame, first frame, second frame, . . . , and k-th frame, feedback coefficient w is represented by 1/(k+1). When it has been determined that identical images contain noise, the weighting factor becomes maximum value (1) and α becomes ½. When it has been determined that images be different, the weighting factor becomes minimum (0) and a becomes 0.

Figure 9:
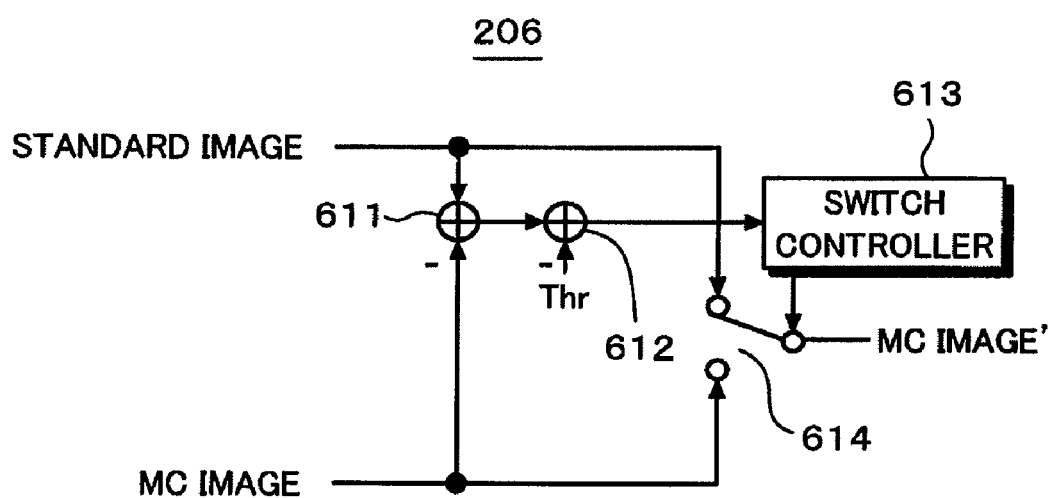
FIG. 9 is a block diagram showing an example of a hidden area process device disposed in the addition reliability determination device.

FIG. 9 shows an example of the hidden area process device 206. The hidden area process device 206 prevents deterioration of image quality of an MC portion in a hidden area having low reliability from propagating when an MC image that is chronologically apart from a standard image by at least one image is used as a reference image. As shown in FIG. 9, a subtraction device 611 obtains the difference between the standard image and the MC image. A subtraction device 612 subtract threshold value Thr from the difference. The subtracted result is supplied to a switch controller 613. A pixel contained in the hidden area having low reliability is detected as a pixel larger than threshold value Thr, representing that the subtracted result is plus.

Pixel data of the MC image are supplied to one input terminal of a switch 614, whereas pixel data of the standard image are input to the other input terminal thereof. The switch 614 causes pixel data whose difference value is larger than threshold value Thr to be replaced with pixel data of the standard image. An output image of the switch 614 is stored in the frame memory 201 (see FIG. 2). The output image of the switch 614 is used as a reference image in the next frame process.

Next, a specific example of processes of the foregoing embodiment of the present invention will be described. First, with reference to a flow chart and a state transition diagram shown in FIG. 10 and FIG. 11, a still image process of serially shooting, for example, three still images and reducing noise therefrom will be described. In this example, it is assumed that three still images shot at times t, t+1, and t+2 are represented by Org(t), Org(t+1), and Org(t+2), respectively.

Figure 11:
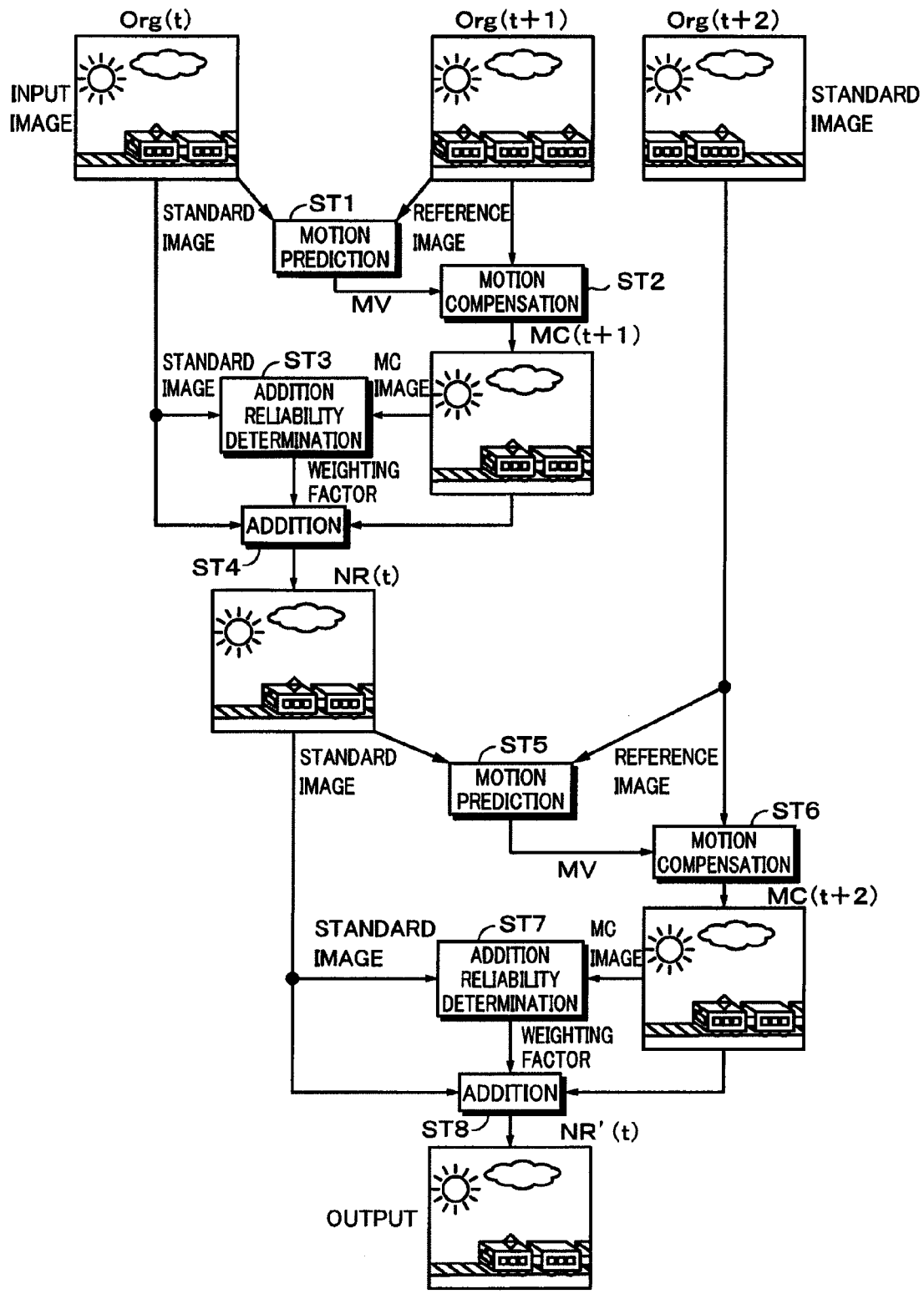
FIG. 11 is a state transition diagram describing a reference relationship of the still image process.

At the first step S1 of the flow chart, the motion prediction device 202 predicts the motion of Org(t+1) as a reference image against Org(t) as a standard image and thereby obtains moving vector MV. In FIG. 11, the process of obtaining moving vector MV that represents the motion of reference image Org(t+1) against standard image Org(t) is represented by motion prediction ST1.

At step S2, the motion compensation device 203 compensates the motion of reference image Org(t+1) with moving vector MV and thereby obtains MC image MC(t+1). In FIG. 11, the process of obtaining the MC image is represented by motion compensation ST2.

At step S3, the addition reliability determination device 204 determines the reliability of addition with standard image Org(t) and MC image MC(t+1) that has been aligned by motion compensation and thereby obtains a weighting factor. In FIG. 11, the process of obtaining the weighting factor is represented by addition reliability determination ST3.

At step S4, the addition device 205 adds standard image Org(t) and MC image MC(t+1) with the weighting factor. In FIG. 11, the addition process is represented by addition ST4. By the addition process, NR image NR(t) from which noise has been reduced is obtained.

Next, at step S5, the motion prediction device 202 predicts the motion of still image Org(t+2) as a reference image against NR image NR(t) as a standard image and thereby obtains moving vector MV. In FIG. 11, the process of obtaining moving vector MV that represents the motion of reference image Org(t+2) against standard image NR(t) is represented by motion prediction ST5.

At step S6, the motion compensation device 203 compensates the motion of reference image Org(t+2) with moving vector MV and thereby obtains MC image MC(t+2). In FIG. 11, the process of obtaining the MC image is represented by motion compensation ST6.

At step S7, the addition reliability determination device 204 determines the reliability of addition of standard image Org(t) and MC image MC(t+2) aligned by the motion compensation process and thereby obtains a weighting factor. In FIG. 11, the process of obtaining the weighting factor is represented by addition reliability determination ST7.

At step S8, the addition device 205 adds standard image Org(t) and MC image MC(t+2) with the weighting factor. In FIG. 11, the addition process is represented by addition ST8. By the addition process, NR image NR'(t) from which noise has been reduced is obtained.

As described above, the standard image is aligned with another image by the motion compensation process and then the standard image and the MC image are added. The NR image as the result of the addition is used as a standard image in the next process. By the similar process, an NR image is obtained. Still images are recursively processed.

Figure 10:
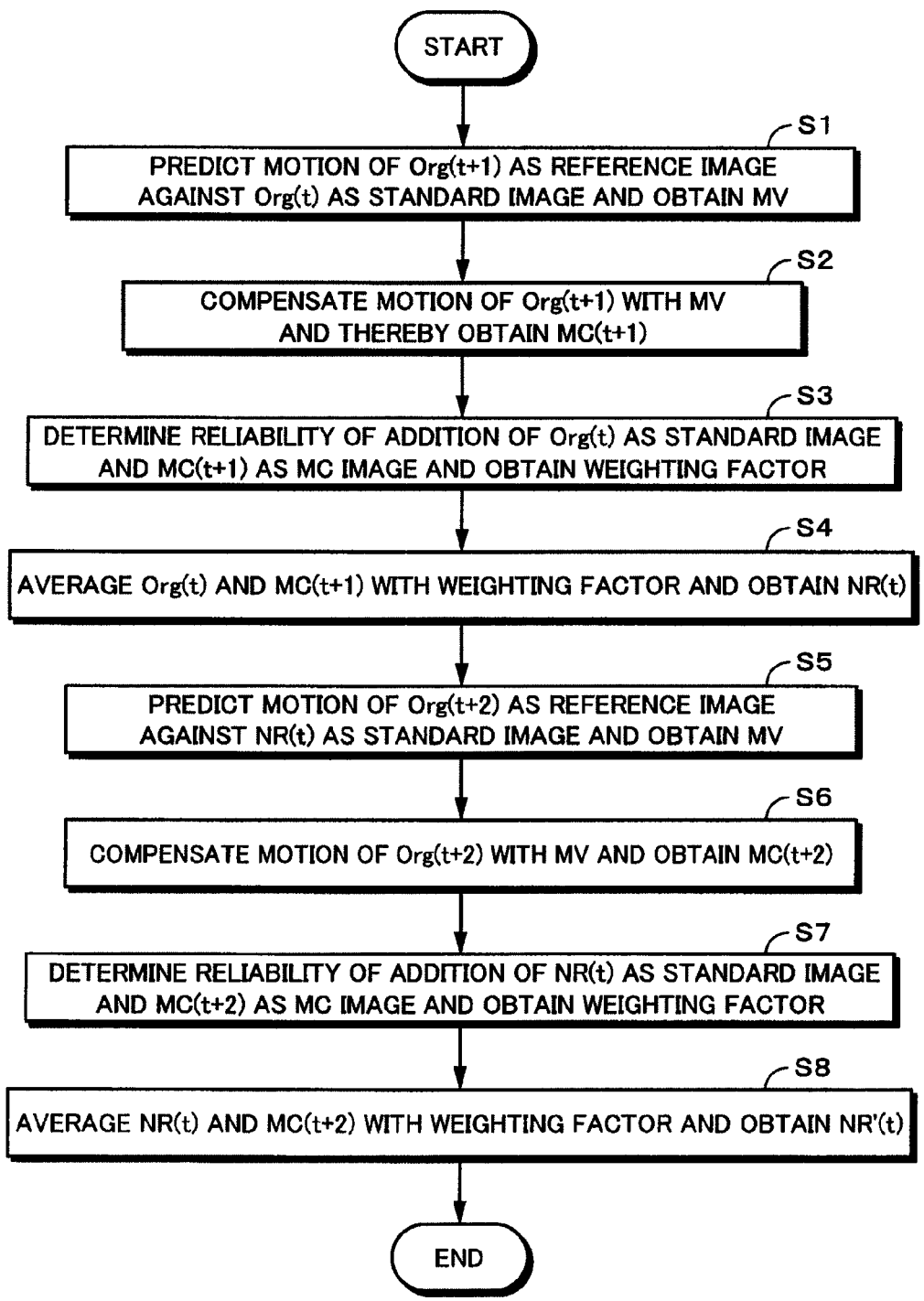
FIG. 10 is a flow chart describing a still image process according to the embodiment of the present invention.

In the processes shown in FIG. 10 and FIG. 11, the motion prediction process and the motion compensation process are performed block by block (for example, macro block by macro block). In contrast, the addition reliability determination process and the addition process are performed pixel by pixel. These processes apply to a moving image process that will be described later. In the foregoing example, three still images are input. The similar recursive processes may be performed even if two or four or more still images are input.

Figure 12:
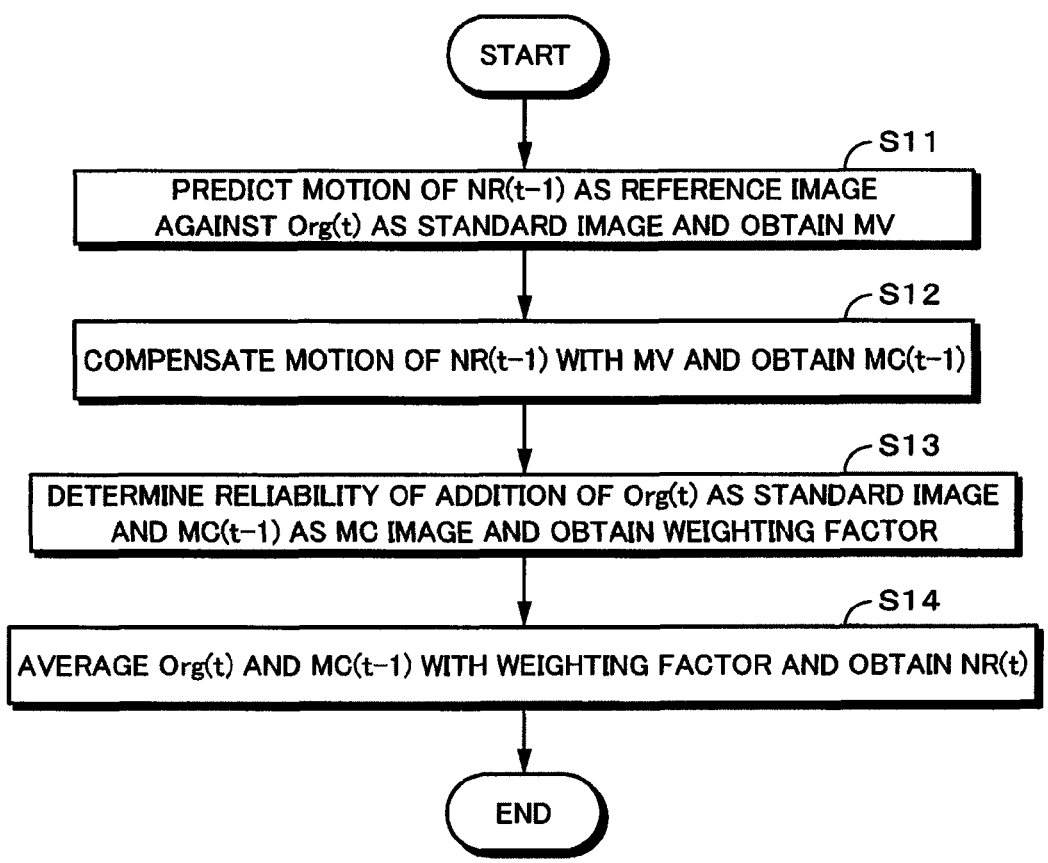
FIG. 12 is a flow chart describing a moving image process that adds two moving images according to the embodiment of the present invention.
Figure 13:
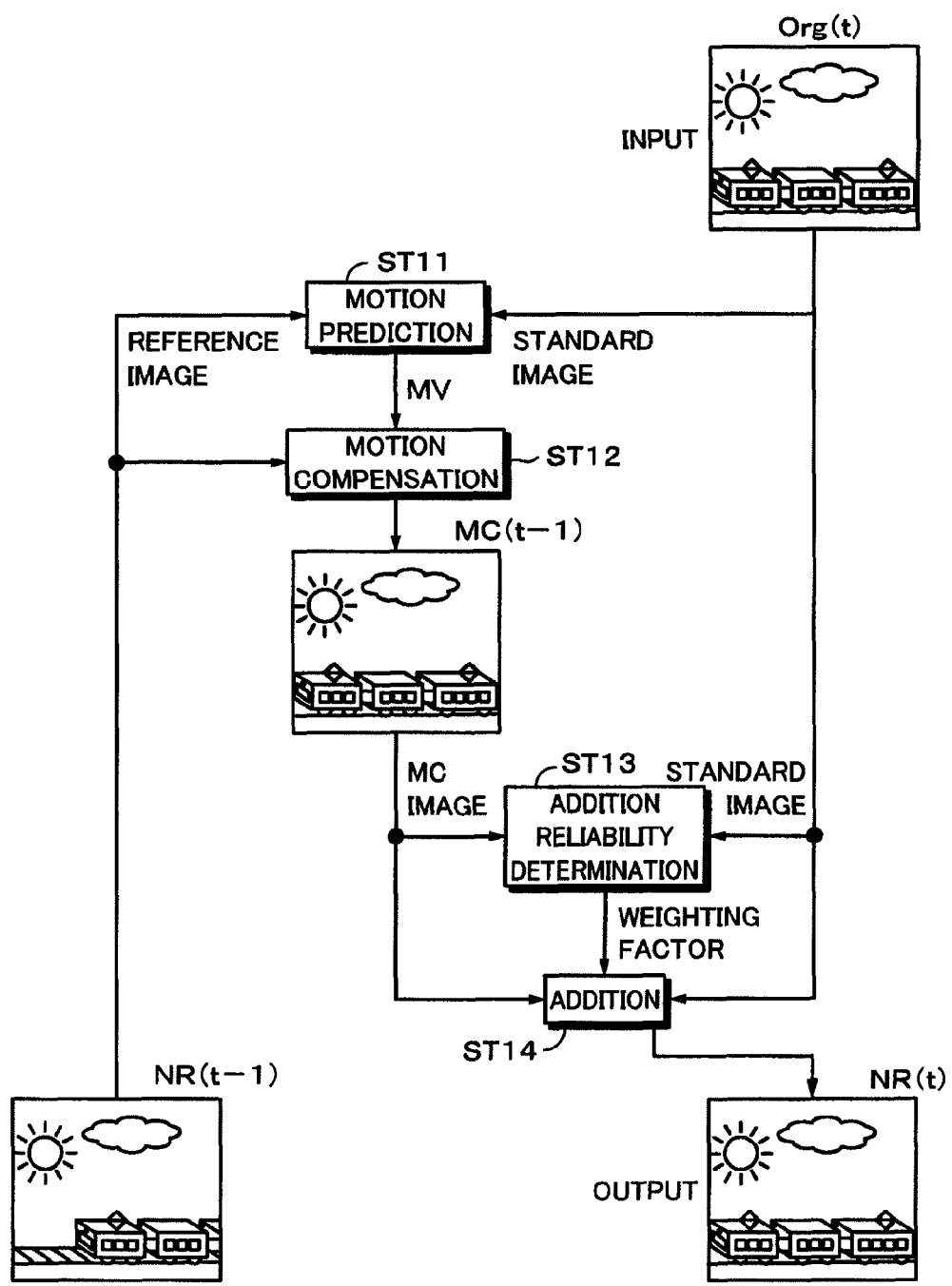
FIG. 13 is a state transition diagram describing a reference relationship of the moving image process that adds two moving images.

Next, with reference to a flow chart shown in FIG. 12 and a state transition diagram shown in FIG. 13, processes of adding two moving images will be described. It is assumed that latest image (frame) shot at time t is represented by Ort(t) and an image that has been processed one frame prior thereto is represented by NR(t−1). In the foregoing still image processes, a plurality of images are obtained by simultaneously shooting them. In the moving image processes, images are continuously shot. At a predetermined frame rate, for example, at intervals of ⅓₀ seconds, each frame is input.

At the first step S11, the motion prediction device 202 predicts the motion of NR(t−1) as a reference image against Org(t) as a standard image and thereby obtains moving vector MV. In FIG. 13, the process of obtaining moving vector MV that represents the motion of reference image NR(t−1) against standard image Org(t) is represented by motion prediction ST11.

At step S12, the motion compensation device 203 compensates the motion of reference image NR(t−1) with moving vector MV and thereby obtains MC image MC(t−1). In FIG. 13, the process of obtaining the MC image is represented by motion compensation ST12.

At step S13, the addition reliability determination device 204 determines the reliability of the addition of standard image Org(t) and MC image MC(t−1) aligned by the motion compensation process and thereby obtains a weighting factor. In FIG. 13, the process of obtaining the weighting factor is represented by addition reliability determination ST13.

At step S14, the addition device 205 adds standard image Org(t) and MC image MC(t−1) with the weighting factor. In FIG. 13, the addition process is represented by addition ST14. By the addition process, NR image NR(t) from which noise has been reduced is obtained. The process for image Org(t+1) of the next frame is the same as the foregoing process that uses NR image NR(t) as a reference image.

In the moving image processes, the latest image and a past image are aligned and added. In the moving image processes, the motion prediction process is not performed the number of times corresponding to the number of moving images to be added. Instead, the motion prediction process is performed only for the immediately preceding image. For an image that is apart by two or more images, an MC image that has been added one image prior to the current image is stored and the motion compensation process is performed with reference to a moving vector of the current image against the immediately preceding image. Thus, the motion prediction process can be performed once for one image.

Figure 14:
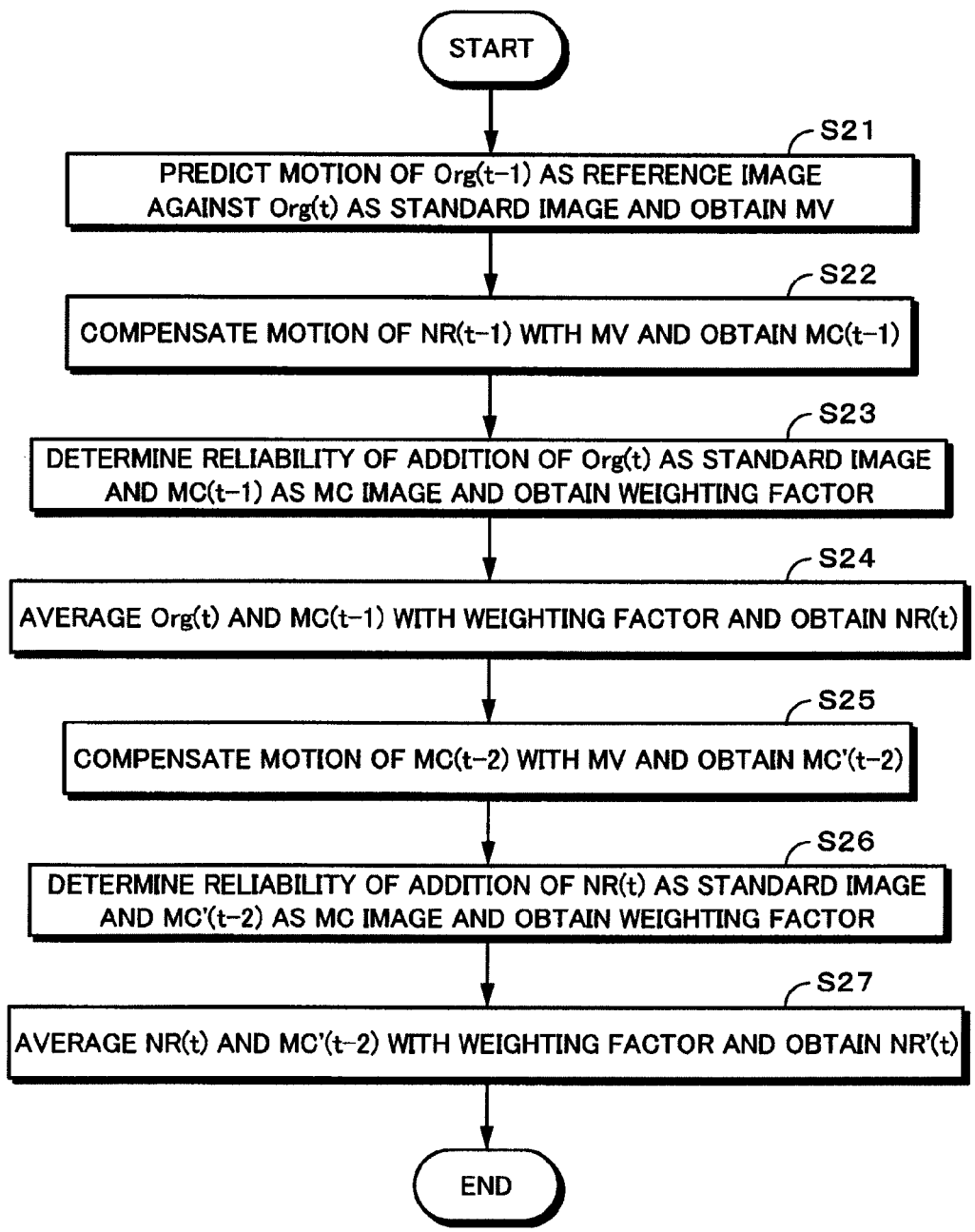
FIG. 14 is a flow chart describing a moving image process that adds three moving images according to the embodiment of the present invention.
Figure 15:
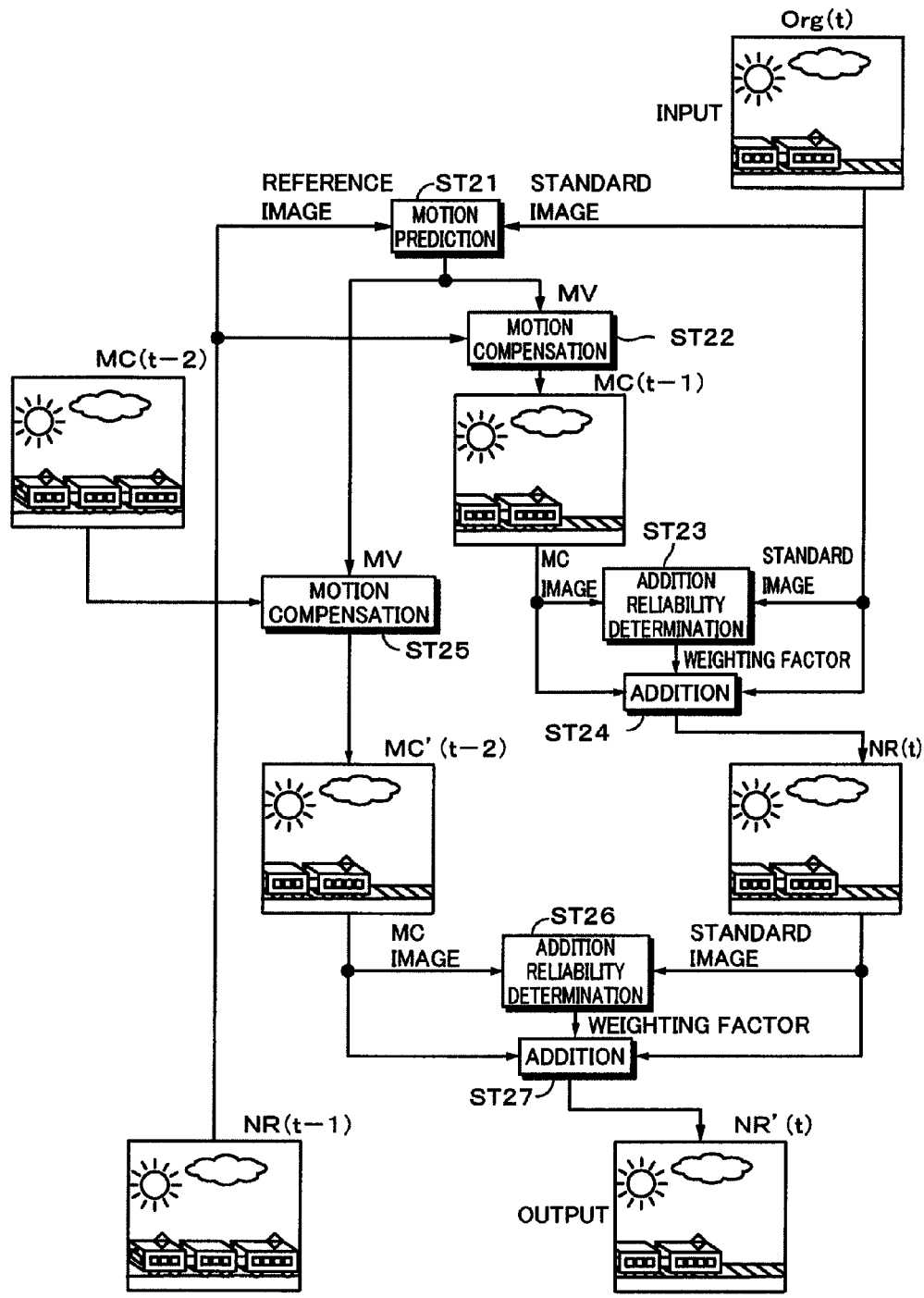
FIG. 15 is a state transition diagram describing a reference relationship of the moving image process that adds three moving images.

FIG. 14 and FIG. 15 are a flow chart and a state transition diagram showing moving image processes of adding three moving images. It is assumed that the latest image (frame) shot at time t is represented by Ort(t), an image that has been processed one frame prior thereto is represented by NR(t−1), and an MC image that has been added and stored one frame prior thereto is represented by MC(t−2).

At the first step S21, the motion prediction device 202 predicts the motion of NR(t−1) as a reference image against Org(t) as a standard image and thereby obtains moving vector MV. In FIG. 15, the process of obtaining moving vector MV that represents the motion of reference image NR(t−1) against standard image Ort(t) is represented by motion prediction ST2.

At step S22, the motion compensation device 203 compensates the motion of reference image NR(t−1) with moving vector MV and thereby obtains MC image MC(t−1). In FIG. 15, the process of obtaining MC image MC(t−1) is represented by motion compensation ST22.

At step S23, the addition reliability determination device 204 determines the reliability of the addition of standard image Org(t) and MC image MC(t−1) aligned by the motion compensation process and thereby obtains a weighting factor. In FIG. 15, the process of obtaining weighting factor is represented by addition reliability determination ST23.

At step S24, the addition device 205 adds standard image Org(t) and MC image MC(t−1) with the weighting factor. In FIG. 15, the addition process is represented by addition ST24. By the addition process, NR image NR(t) from which noise has been reduced is obtained.

At step S25, the motion compensation device 203 compensates the motion of MC image MC(t−2) with moving vector MV and thereby obtain MC image MC'(t−2). In FIG. 15, the process of obtaining MC image MC'(t−2) is represented by motion compensation ST25.

At step S26, the addition reliability determination device 204 determines the reliability of the addition of NR image NR(t) as a standard image and MC image MC'(t−2) and thereby obtains a weighting factor. In FIG. 15, the process of obtaining the weighting factor is represented by addition reliability determination ST26.

At step S27, the addition device 205 adds NR image NR(t) and MC image MC'(t−2) with the weighting factor. In FIG. 15, the addition process is represented by addition ST27. By the addition process, NR image NR'(t) from which noise has been reduced is obtained.

Like the foregoing processes, the motion prediction process is performed once at step S21 (ST21). By performing the motion compensation process for NR(t−1) and MC(T−2) with moving vector MV, three images can be added without a large increase of calculation amount.

Figure 16:
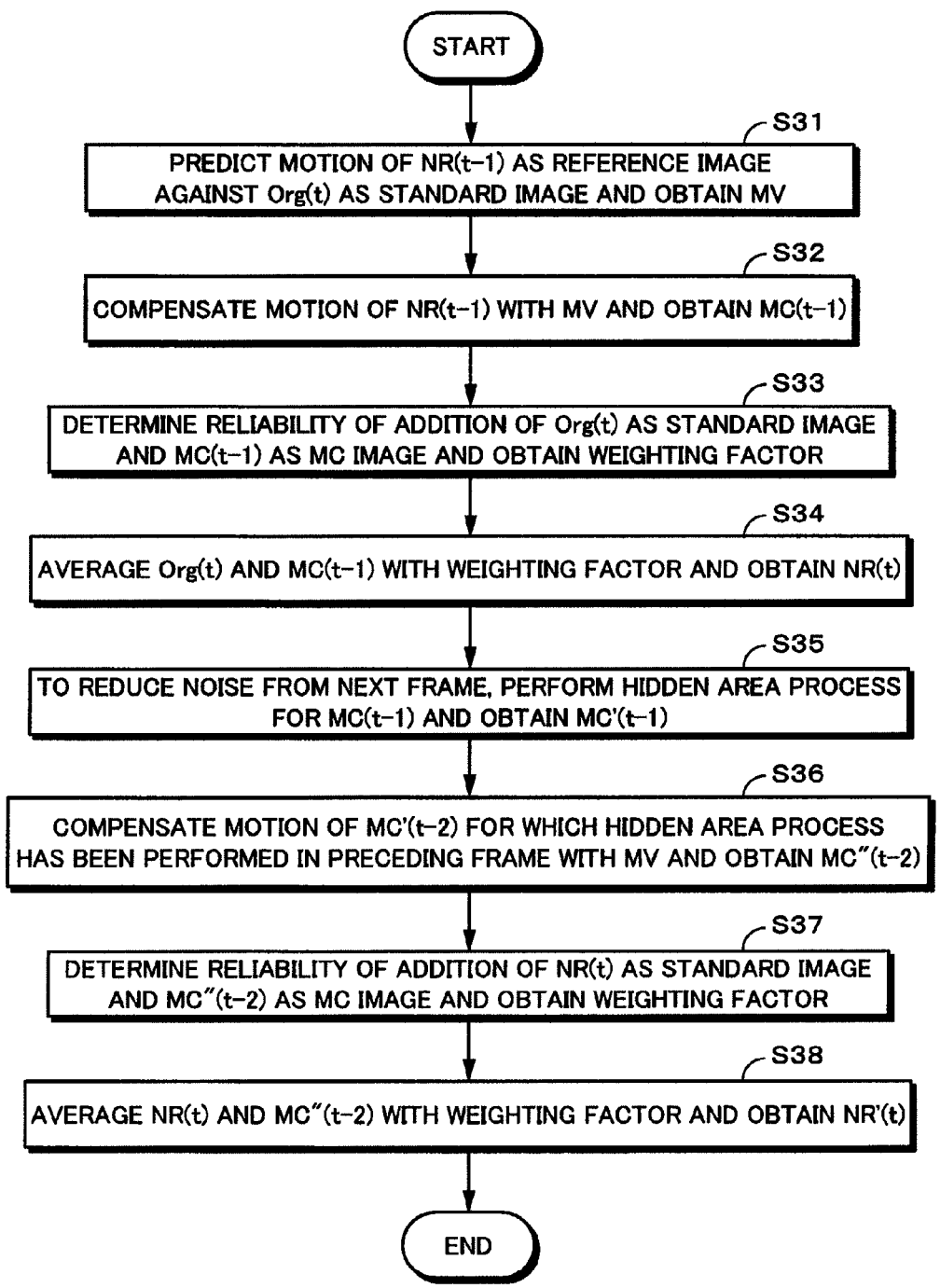
FIG. 16 is a flow chart describing a moving image process (including a hidden area process) that adds three moving images according to the embodiment of the present invention.
Figure 17:
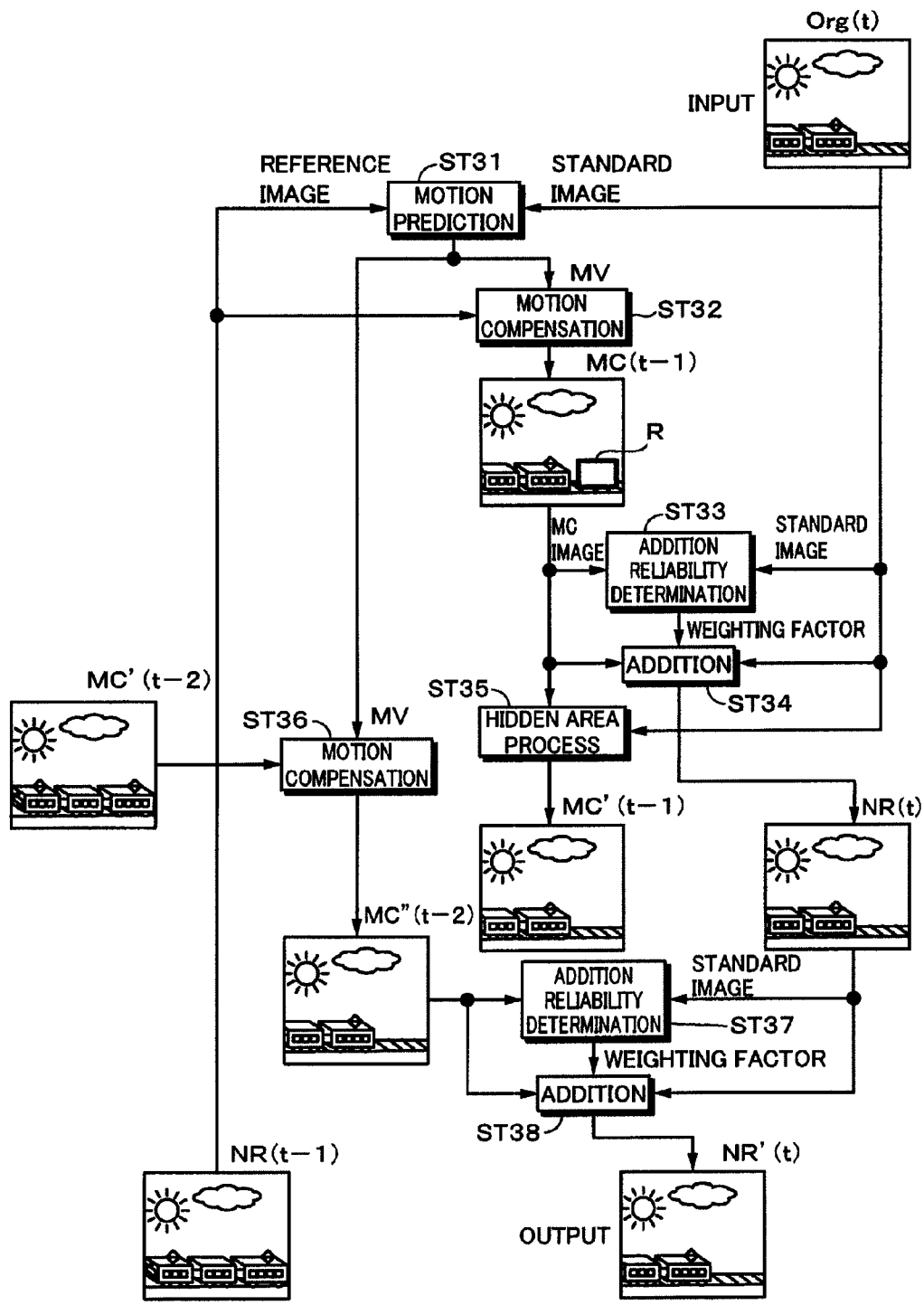
FIG. 17 is a state transition diagram describing a reference relationship in the moving image process (including the hidden area process) that adds three moving images.

FIG. 16 and FIG. 17 are a flow chart and a state transition diagram showing processes of adding three moving images and a hidden area process. It is assumed that the latest image (frame) shot at time t is represented by Org(t), an image that has been processed one frame prior thereto is represented by NR(t−1), and an MC image that has been added and stored one image prior thereto is represented by MC'(t−2).

The motion prediction process at step S31 (ST31) and the motion compensation process at step S32 (ST32) correspond to those at step S21 (ST21) and step S22 (ST22) shown in FIG. 14 and FIG. 15.

The addition reliability determination process at step S33 (ST33) and the addition process at step S34 (ST34) correspond to those at step S23 (ST23) and step S24 (ST24) shown in FIG. 14 and FIG. 15. By the addition process, NR image NR(t) from which noise has been reduced is obtained.

At step S35, the hidden area process device 206 performs a hidden area process for MC image MC(t−1) to reduce noise of the next frame and thereby obtains MC image MC'(t−1). In FIG. 17, the range of the hidden area hidden by a moving object in the motion compensation process is represented by R and the hidden area process is represented by hidden area process ST35.

At step S36, the motion compensation device 203 compensates the motion of MC image MC'(t−2) with moving vector MV and thereby obtains MC image MC"(t−2). In FIG. 17, the process of obtaining MC image MC"(t−2) is represented by motion compensation ST36.

At step S37, the addition reliability determination device 204 determines the reliability of the addition of NR image NR(t) as a standard image and MC image MC"(t−2) and thereby obtains a weighting factor. In FIG. 17, the process of obtaining the weighting factor is represented by addition reliability determination ST37.

At step S38, the addition device 205 adds NR image NR(t) and MC image MC"(t−2) with the weighting factor. In FIG. 17, the addition process is represented by addition ST38. By the addition process, NR image NR"(t) from which noise has been reduced is obtained.

In the foregoing processes, the hidden area process is performed for image MC(t−1) of which image NR(t−1) has been motion-compensated one time unit prior thereto and thereby MC'(t−1) is generated. MC'(t−1) is used for the next noise reduction process. As a result, three images can be added with suppression of propagation of image deterioration in the hidden area.

Next, another embodiment of the present invention will be described. In the foregoing embodiment, the motion of an image is compensated against a standard image block by block and thereby an MC image is generated. It is determined whether or not the addition of the MC image is reliable pixel by pixel. As a result, noise reduction effects for hand vibration and a moving object can be obtained. However, under a particular condition, image quality may deteriorate due to the motion estimation process and the motion compensation process.

In other words, when many MC images are added, nearly same block distortion occurs at the same position. When the pixel value of the distortion is close to that of a standard image, the MC images that are added cause deterioration to cumulate. As a result, block distortion occurs in the processed image. In reality, when a plurality of images are shot by a camera that does not largely move, if a moving object is present only in a standard image and the moving object is not present in other images, the motion of the moving object is unable to be correctly estimated. Thus the same block distortion occurs nearly in all MC images.

In addition, in a particular condition, conspicuous noise may not be sufficiently reduced. In other words, spatially larger color noise that occurs in a flat portion has a large amplitude. When the weighting factor of this portion is increased in the addition reliability process, the noise is unable to be determined. Thus, it is difficult to reduce the noise.

To solve these problems, when it is determined whether the addition of a standard image and an MC image is reliable pixel by pixel, the following procedure is performed. Taking account of block distortion that occurs in an MC image, in an area where noise is present, a block boundary is inconspicuous due to noise. In an area where noise is small, a block boundary is conspicuous. Thus an area where noise is small and that is flat, namely an area where noise is conspicuous, is detected and the weighting factor is corrected to be decreased in this area. This weighting factor correction allows block distortion that occurs in an MC image to be suppressed.

Next, a process of reducing spatially large color noise that occurs in a flat portion will be described. When color difference of pixels of a standard image and an MC image is large, an area that is flat and where color noise is present and the average of color difference is small is determined to be color noise and the weighting factor to be added is increased.

Figure 18:
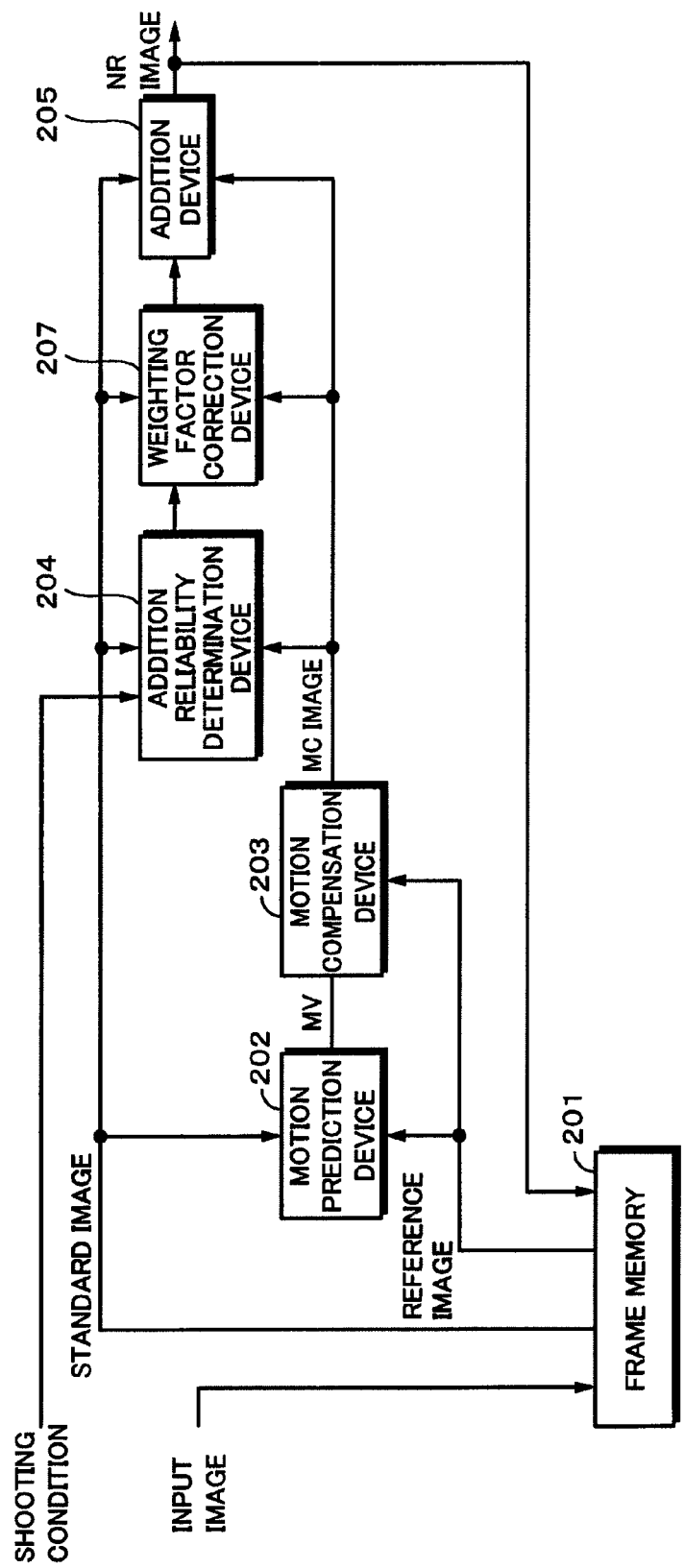
FIG. 18 is a block diagram showing an example of a noise reduction device according to the embodiment of the present invention.

FIG. 18 shows a structure of a noise reduction device that performs a process of correcting a weighting factor to be added according to the other embodiment of the present invention. The noise reduction device has a frame memory 201, a motion prediction device 202, a motion compensation device 203, an addition reliability determination device 204, a weighting factor correction device 207, and an addition device 205. The noise reduction device may have a hidden area process device as with the foregoing embodiment.

The structure of the other embodiment is the same as that of the foregoing embodiment except for the weighting factor correction device 207 that corrects a weighting factor that is output from the addition determination device 204. In other words, the noise reduction device is a weighting factor correction device that corrects a weighting factor that is output from an addition reliability determination device (having the structure shown in FIG. 3). The structure of the image capturing device of the foregoing embodiment (see FIG. 1), the structure of the noise reduction device (see FIG. 2), and structure and characteristics of the addition reliability determination device (see FIG. 4) are the same as those of the other embodiment.

Figure 19:
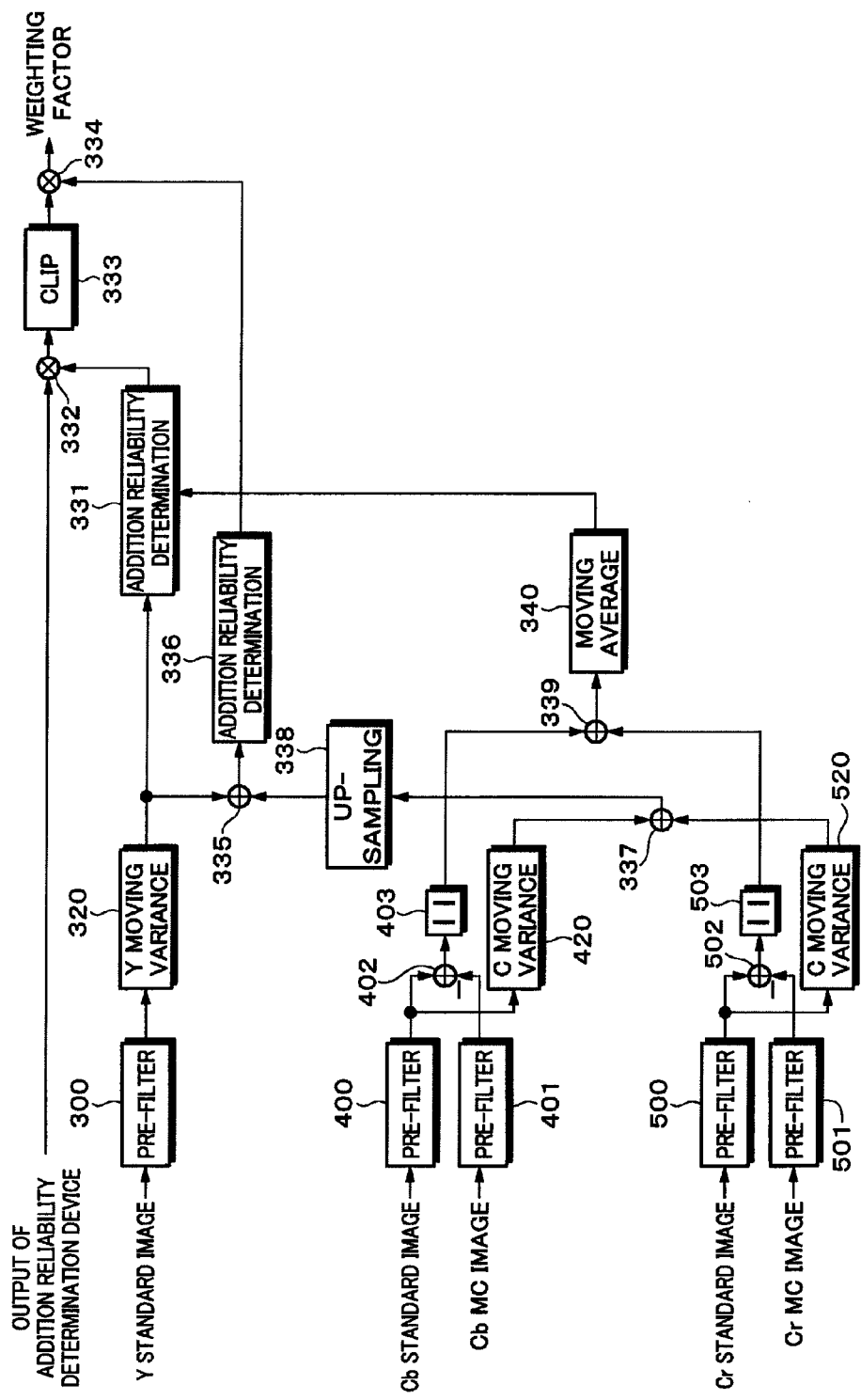
FIG. 19 is a block diagram showing an example of a structure of a weighting factor correction device according to another embodiment of the present invention.

FIG. 19 shows a weighting factor correction device that corrects a weighting factor that is output from an addition reliability determination device (having the structure shown in FIG. 3). The weighting factor that is output from the addition reliability determination device is supplied to a multiplication device 332. A weighting factor generated by an addition reliability determination device 331 addressing suppression of the foregoing color noise is supplied to the multiplication device 332.

An output signal of the multiplication device 332 is supplied to a clip circuit 333. The clip circuit 333 clips a value to 1 when the value exceeds 1. An output signal of the clip circuit 333 is supplied to a multiplication device 334. A weighting factor generated by an addition reliability determination device 336 addressing the foregoing block noise of an MC image is supplied to the multiplication device 334. The multiplication device 334 outputs a weighting factor corrected against noise. The weighting factor is supplied to the addition device 205.

An output signal of an addition device 335 is supplied to the addition reliability determination device 336 against block noise. A moving variance obtained by a moving variance calculation device 320 for a standard image for the luminance signal is supplied through a pre-filter 300 to one input of an addition device 335. An output signal of an up-sampling circuit 338 is supplied to the other input of the addition device 335.

An output signal of an addition device 337 is supplied to the up-sampling circuit 338. A moving variance obtained by a color difference moving variance calculation device 420 for a standard image for color difference signal (Cb) is supplied through a pre-filter 400 to one input of the addition device 337. A moving variance obtained by a color difference moving variance calculation device 520 for a standard image for color difference (Cr) signal is supplied through the pre-filter 400 to the other input of the addition device 337. The size of a square area to calculate the moving variance of the luminance signal is the same as that of the color difference signal. The up-sampling circuit 338 is disposed to interpolate color difference signals whose pixels are smaller than those of the luminance signal.

Figure 20:
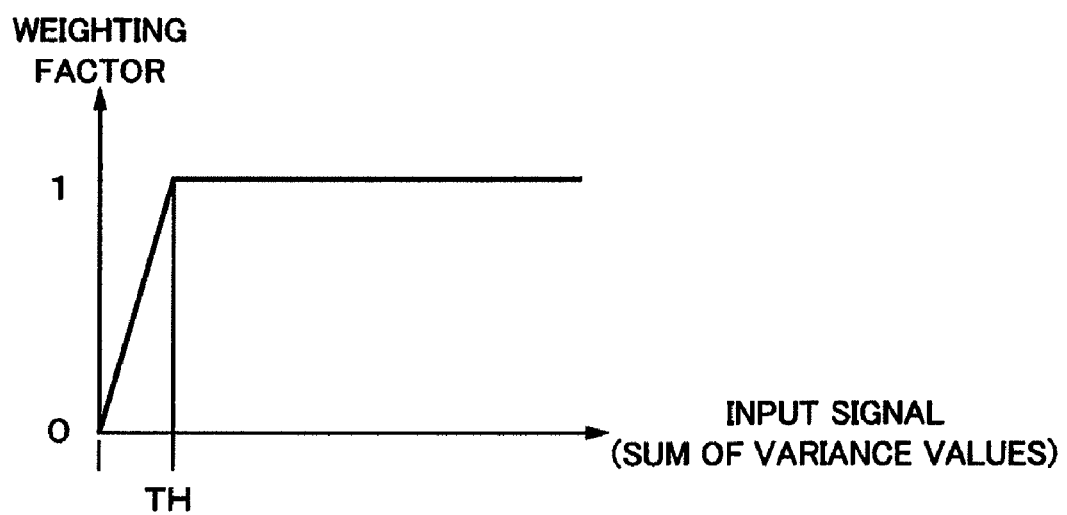
FIG. 20 is a schematic diagram describing a block noise reduction process according to the other process of the present invention.

As shown in FIG. 20, the addition reliability determination device 336 corrects the weighting factor of the input signal (sum of variance values) supplied from the addition device 335. When the value of the input signal is smaller than threshold value HT, the addition reliability determination device 336 increases the weighting factor of the input signal. When the value of the input signal is larger than threshold value TH, the addition reliability determination device 336 outputs 1 as the weighting factor. When the weighting factor is 1, it does not affect a weighting factor supplied from the addition reliability determination device.

It can be estimated that an area where the sum of variance values of a standard image is small is an area where noise is small and that is flat, namely an area where noise is conspicuous. When the weighting factor is corrected to be decreased in this area, block distortion that occurs in an MC image can be suppressed. The weighting factor that is smaller than 1 is multiplied by a weighting factor supplied from the addition reliability determination device. As a result, the weighting factor is decreased.

A moving variance of a standard image for the luminance signal that is output from the moving variance calculation device 320 for the luminance signal and a moving average that is output from a moving average calculation device 340 for color difference signals are supplied to the addition reliability determination device 331 against color noise. The absolute value of the difference of pixels of color difference signal (Cb) of the standard image and the absolute value of the difference of pixels of color difference signal (Cr) of the standard image are added by an addition device 339. The moving average calculation device 340 for the color difference signals calculates the moving average of the absolute value of the difference of pixels of the color difference signals that is output from the addition device 339. The moving variance calculation device 320 and the moving average calculation device 340 obtain a moving variance and a moving average of a square area around a pixel to be calculated. The size of the square area is larger than color noise to be removed.

The addition reliability determination device 331 has hardware or software structure that performs processes shown in FIG. 21. At the first step S41, it is determined whether or not the luminance variance value is within a predetermined threshold value. When the luminance variance value is within the threshold value, it means that the area is flat. When the area is not flat, the flow advances to step S44 where the weighting factor is set to 1. Thereafter, the processes are complete. When the weighting factor is 1, it does not affect multiplication by a weighting factor supplied from the addition reliability determination device.

When the determined result at step S41 denotes that the area is flat, it is determined whether or not the moving average of the absolute value of the difference of pixels of the color difference signals is within a predetermined threshold value. When the determined result at step S41 denotes that the moving average is within the threshold value, it is determined that the area have color noise. Thereafter, the flow advances to step S43. When the determined result does not denote that the moving average is within the threshold value, the flow advances to step S44 (weighting factor=1).

At step S43, the weighting factor is set to a value larger than 1 and then the processes are completed. The weighting factor that has been set to a value larger than 1 is multiplied by a weighting factor supplied from the addition reliability determination device. As a result, the weighting factor is increased. Thus, the color noise removing effect is improved. The threshold value and weighting factor are set taking into account of visual influence. When the result of the multiplication by the weighting factor larger than 1 exceeds 1, the clip circuit 333 sets the weighting factor to 1.

According to the other embodiment of the present invention, in addition to noise reduction effect as with the foregoing embodiment, block distortion can be suppressed. In addition, spatially large color noise that occurs in a flat portion can be suppressed.

It should be understood by those skilled in the art that various modifications, combinations, sub-combinations and alternations may occur depending on design requirements and other factors insofar as they are within the scope of the appended claims or the equivalents thereof. For example, in the foregoing example, a standard image and an MC image are averaged with a weighting factor. Instead, they may be simply added. In other words, dirk images that are free from hand vibration and noise may be aligned, determined for reliability of their addition, and added with a weighting factor. Finally, they may be normalized pixel by pixel.

What is claimed is:

1. An image processing method of reducing noise from moving images which are input at intervals of a predetermined time unit, comprising the steps of:
compensating a motion of an image that has been processed one predetermined time unit before block by block;
determining reliability of addition of a current moving image and the motion-compensated image processed the one predetermined time unit before pixel by pixel and setting a weighting factor corresponding thereto;
adding or averaging the current moving image and the motion-compensated image processed the one predetermined time unit before with the weighting factor and obtaining a processed image corresponding to the current moving image; and
first correcting the weighting factor that is output from determining reliability step,
wherein the correcting step is performed by detecting a case of which block distortion occurs in the processed image; and
second correcting the weighting factor such that the detected block distortion is reduced.

2. An image processing method of using a first still image and a second still image which are chronologically successive and outputting an image from which noise has been reduced, comprising the steps of:
compensating a motion of the second still image block by block;
determining reliability of addition of the first still image and the motion-compensated second still image pixel by pixel and setting a weighting factor corresponding thereto;
adding or averaging the first still image and the motion-compensated second still image with the weighting factor and obtaining a processed image;
first correcting the weighting factor that is output from determining reliability step,
wherein the correcting step is performed by detecting a case of which block distortion occurs in the processed image; and
second correcting the weighting factor such that the detected block distortion is reduced.

3. An image processing method of using a first still image and a second still image which are chronologically successive and outputting an image from which noise has been reduced, comprising the steps of:
compensating a motion of the second still image block by block;
determining reliability of addition of the first still image and the motion-compensated second still image pixel by pixel and setting a weighting factor corresponding thereto;
adding or averaging the first still image and the motion-compensated second still image with the weighting factor and obtaining a processed image;
first correcting the weighting factor that is output from determining reliability step,
wherein the correcting step is performed by detecting large color noise which occurs in a flat portion of the processed image; and
second correcting the weighting factor such that the detected color noise is reduced.

4. An image processing method of using a first still image and a second still image which are chronologically successive and outputting an image from which noise has been reduced, comprising the steps of:

compensating a motion of the second still image block by block;

determining reliability of addition of the first still image and the motion-compensated second still image pixel by pixel and setting a weighting factor corresponding thereto;

adding or averaging the first still image and the motion-compensated second still image with the weighting factor and obtaining a processed image;

correcting the weighting factor that is output from determining reliability step, wherein the addition reliability determining step performed pixel by pixel includes the steps of:

providing a plurality of tables of pixel values and noise amounts and estimating noise amount corresponding to one selected from the tables according to a shooting condition;

generating a table which represents a relationship of an index value and a weighting factor of two pixels at a specially same position of two images corresponding to the estimated noise amount; and obtaining a weighting factor for the index value according to the table, wherein the index value is an absolute value of a difference of the two pixels, an absolute value of a difference of moving averages of the two pixels, or an absolute value of a difference of moving variances of the two pixels.

5. An image processing apparatus which uses a first still image and a second still image which are chronologically successive and which outputs an image from which noise has been reduced, comprising:

a motion compensation device which compensates a motion of the second still image block by block;

a determination device which determines reliability of addition of the first still image and the motion-compensated second still image pixel by pixel and which sets a weighting factor corresponding thereto;

an addition device which adds or averages the first still image and the motion-compensated second still image with the weighting factor and which obtains a processed image; and a first correcting device which corrects the weighting factor that is output from the determination device, wherein the correcting device detects in which block distortion occurs in the processed image; and a second correcting device to correct the weighting factor such that the detected block distortion is reduced.

6. An image processing apparatus which reduces noise from moving images which are input at intervals of a predetermined time unit, comprising:

a motion compensation device;

a determination device;

an addition device; and a correcting device, wherein the motion compensation device compensates a motion of an image that has been processed one predetermined time unit before block by block, the determination device determines reliability of addition of a current moving image and the motion-compensated image processed the one predetermined time unit before pixel by pixel and sets a weighting factor corresponding thereto, the addition device adds or averages the current moving image and the motion-compensated image processed the one predetermined time unit before with the weighting factor and obtains a processed image corresponding to the current moving image, and the correcting device corrects the weighting factor by detecting a case of which block distortion occurs in the processed image and correcting the weighting factor such that the detected block distortion is reduced.

* * * * *